(12) United States Patent
Si et al.

(10) Patent No.: US 12,484,038 B2
(45) Date of Patent: Nov. 25, 2025

(54) POWER ALLOCATION METHOD AND DEVICE

(71) Applicant: VIVO MOBILE COMMUNICATION CO., LTD., Guangdong (CN)

(72) Inventors: Ye Si, Dongguan (CN); Huaming Wu, Dongguan (CN); Yuanyuan Wang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 386 days.

(21) Appl. No.: 18/089,921

(22) Filed: Dec. 28, 2022

(65) Prior Publication Data
US 2023/0171758 A1    Jun. 1, 2023

Related U.S. Application Data

(63) Continuation of application No. PCT/CN2021/109318, filed on Jul. 29, 2021.

(30) Foreign Application Priority Data

Jul. 29, 2020 (CN) .......................... 202010747510.0

(51) Int. Cl.
H04W 72/044 (2023.01)
H04L 5/00 (2006.01)
H04W 72/21 (2023.01)
H04W 72/56 (2023.01)

(52) U.S. Cl.
CPC ....... *H04W 72/0473* (2013.01); *H04L 5/0048* (2013.01); *H04W 72/21* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 8,982,801 B2 | 3/2015 | Shin et al. | |
| 10,182,451 B2 | 1/2019 | Kim et al. | |
| 10,548,096 B2 | 1/2020 | Papasakellariou | |
| 10,721,043 B2 | 7/2020 | Kim et al. | |
| 2011/0117926 A1 | 5/2011 | Hwang et al. | |
| 2011/0275335 A1* | 11/2011 | Luo ...................... | H04W 52/367 455/127.1 |
| 2013/0208710 A1* | 8/2013 | Seo ........................ | H04W 72/21 370/336 |

(Continued)

FOREIGN PATENT DOCUMENTS

| | | |
|---|---|---|
| CN | 102265687 A | 11/2011 |
| CN | 102308640 A | 1/2012 |

(Continued)

*Primary Examiner* — Hassan A Phillips
*Assistant Examiner* — Gautam Sharma
(74) *Attorney, Agent, or Firm* — The Webb Law Firm

(57) ABSTRACT

A power allocation method includes: in a case that a total transmit power of UE on a time domain unit is greater than a power threshold, allocating, by the UE, a transmit power to an uplink transmission on the time domain unit according to a power allocation priority. The uplink transmission includes at least one of a SRS_pos or PSI, and the power allocation priority includes a power allocation priority of the uplink transmission.

20 Claims, 3 Drawing Sheets

(56) References Cited

U.S. PATENT DOCUMENTS

| | | | | |
|---|---|---|---|---|
| 2013/0215811 A1* | 8/2013 | Takaoka | ................ | H04W 52/30 370/311 |
| 2015/0201388 A1* | 7/2015 | Cheng | ................... | H04W 52/14 370/329 |
| 2015/0208404 A1* | 7/2015 | Yie | ...................... | H04W 76/15 370/329 |
| 2017/0288832 A1 | 10/2017 | Islam et al. | | |
| 2018/0139701 A1* | 5/2018 | Wang | ................. | H04W 52/146 |
| 2018/0167895 A1 | 6/2018 | Lee et al. | | |
| 2020/0154449 A1 | 5/2020 | Akkarakaran et al. | | |
| 2020/0305202 A1* | 9/2020 | Zhang | ................... | H04W 72/04 |
| 2021/0092763 A1* | 3/2021 | Li | ....................... | H04W 72/569 |
| 2023/0164702 A1* | 5/2023 | Lee | ...................... | H04W 52/32 455/522 |
| 2023/0171758 A1* | 6/2023 | Si | ......................... | H04L 5/0051 370/329 |

FOREIGN PATENT DOCUMENTS

| | | |
|---|---|---|
| CN | 103826294 A | 5/2014 |
| CN | 105453684 A | 3/2016 |
| CN | 108886450 A | 11/2018 |
| CN | 110266372 A | 9/2019 |
| CN | 110547001 A | 12/2019 |
| CN | 110858998 A | 3/2020 |
| WO | 2020146570 A1 | 7/2020 |

\* cited by examiner

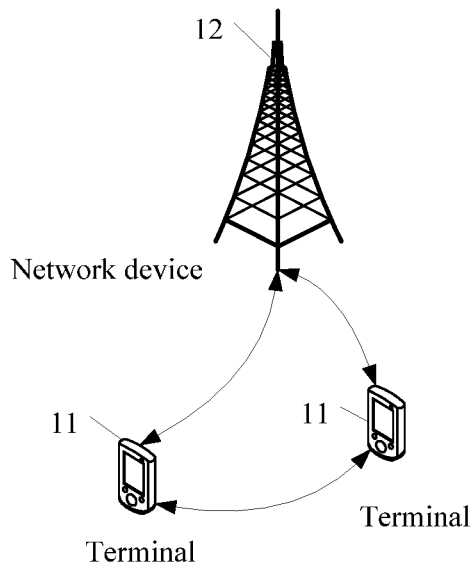
FIG. 1
In a case that a total transmit power of UE on a time domain element is greater than a power threshold, the UE allocates a transmit power to an uplink transmission on the time domain element according to a power allocation priority — S200
FIG. 2
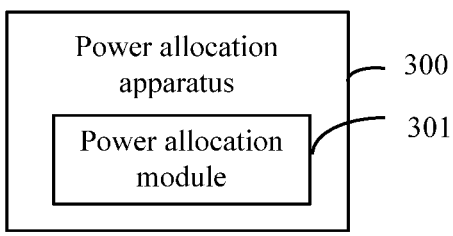
FIG. 3

POWER ALLOCATION METHOD AND DEVICE

CROSS-REFERENCE TO RELATED APPLICATIONS

This application is a Bypass Continuation Application of PCT/CN2021/109318 filed Jul. 29, 2021, which claims priority to Chinese Patent Application No. 202010747510.0 filed Jul. 29, 2020, the disclosures of which are hereby incorporated by reference in their entirety.

BACKGROUND OF THE INVENTION

Field of the Invention

Embodiments of this application relate to the communications field, and in particular, to a power allocation method and apparatus, and a device.

Description of Related Art

Generally, in an uplink transmission process, if a transmit power of user equipment (UE) on a symbol exceeds a total transmit power of the UE, the UE may re-allocate a transmit power to each uplink transmission on the symbol.

SUMMARY OF THE INVENTION

According to a first aspect, a power allocation method is provided. The method includes: in a case that a total transmit power of user equipment UE on a time domain unit is greater than a power threshold, allocating, by the UE, a transmit power to an uplink transmission on the time domain unit according to a power allocation priority, where the uplink transmission includes at least one of a sounding reference signal for positioning (SRS_pos) or positioning state information (PSI), and the power allocation priority includes a power allocation priority of the uplink transmission.

According to a second aspect, a power allocation apparatus is provided. The power allocation apparatus includes a power allocation module, and the power allocation module is configured to: in a case that a total transmit power of UE on a time domain unit is greater than a power threshold, allocate a transmit power to an uplink transmission on the time domain unit according to a power allocation priority, where the uplink transmission includes at least one of an SRS_pos or PSI, and the power allocation priority includes a power allocation priority of the uplink transmission.

According to a third aspect, a user equipment UE is provided. The UE includes a processor, a memory, and a program or an instruction stored in the memory and executable on the processor, where when the program or the instruction is executed by the processor, the steps of the method in the first aspect are implemented.

According to a fourth aspect, a non-transitory computer-readable storage medium is provided. The non-transitory computer-readable storage medium stores a program or an instruction, and when the program or the instruction is executed by a processor, the steps of the method in the first aspect are implemented.

According to a fifth aspect, a chip is provided. The chip includes a processor and a communications interface, the communications interface is coupled to the processor, and the processor is configured to execute a program or an instruction to implement the method in the first aspect.

BRIEF DESCRIPTION OF DRAWINGS

FIG. 1 is a block diagram of a wireless communications system according to an embodiment of this application;

FIG. 2 is a schematic flowchart of a power allocation method according to an embodiment of this application;

FIG. 3 is a schematic structural diagram of a power allocation apparatus according to an embodiment of this application;

DESCRIPTION OF THE INVENTION

Figure 4:
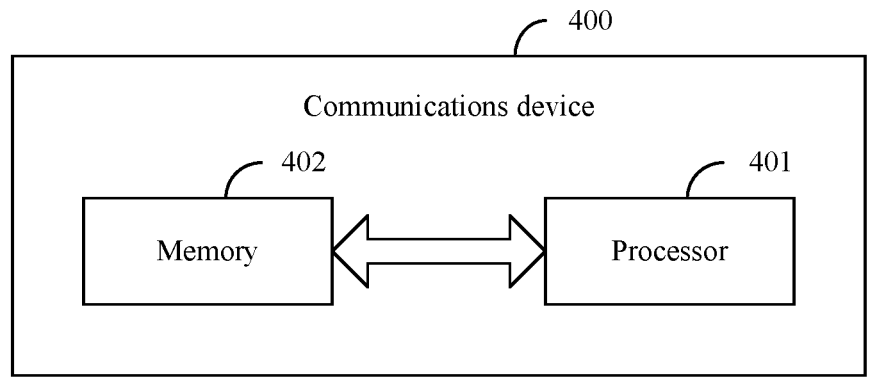
FIG. 4 is a schematic structural diagram of hardware of a communications device according to an embodiment of this application.

Related terms and concepts in the embodiments of this application are explained below.

1. An uplink transmission in the embodiments of this application may include at least one of:

(1) Sounding reference signal for positioning SRS_pos.

The sounding reference signal for positioning includes an aperiodic sounding reference signal for positioning, a semi-persistent sounding reference signal for positioning and a periodic sounding reference signal for positioning.

(2) Positioning state information PSI.

The positioning state information includes PSI carried on a physical uplink shared channel (PUSCH) (PSI on PUSCH), PSI carried on a physical uplink control channel (PUCCH) (PSI on PUCCH), aperiodic PSI carried on a PUSCH (aperiodic PSI on PUSCH), semi-persistent PSI carried on a PUSCH (semi-persistent PSI on PUSCH), semi-persistent PSI carried on a PUCCH (semi-persistent PSI on PUCCH), and periodic PSI carried on a PUCCH (periodic PSI on PUCCH).

Content of the positioning state information may include at least one of: a location estimation result, positioning event information, a positioning measurement result, or other positioning state information.

The other positioning state information includes at least one of:

a spatial relation, if not appropriate; where it should be noted that the spatial relation may be a spatial relation of an uplink positioning signal, or may be a spatial relation of a downlink positioning signal;

positioning assistance information, if not appropriate, requesting to be updated;

information related to a path loss reference signal, for example, the path loss reference signal cannot be measured;

a resource request, where the resource request may include a resource request of positioning information and/or a resource request of a positioning signal; and it should be noted that, the resource request may indicate that a resource is used for positioning or used for positioning information, and the resource request may indicate a type of positioning information for which the resource is used;

a resource request size, where the resource request size indicates a resource size required by a terminal on a network side;

a type of reported location information;
information indicating that resources are insufficient;
information indicating that no positioning signal or positioning assistance information is received;
information indicating that no sufficient positioning signals or positioning assistance information are received;
relation information between a reporting resource and a measurement window, where the relation information may be matching or mismatching or time offset information; and it should be noted that when a reporting resource configured by a base station does not match a measurement window or a measurement reporting time, the base station is notified of a corresponding offset;
relation information between a reporting resource and a measurement time, where the relation information may be matching or mismatching or time offset information; and it should be noted that when a reporting resource configured by a base station does not match a measurement time or a measurement reporting time, the base station is notified of a corresponding offset; or
hybrid automatic repeat request HARQ information.

The event information includes but is not limited to at least one of area event information, motion event information, or UE availability. For example, the area event information is an event in which the UE enters, leaves, or stays in a predefined geographical area; the motion event information is an event in which the UE moves from a previous location beyond a predefined straight line distance; the UE availability is any event in which a 5G core network establishes a connection with the UE.

The measurement result and/or the location estimation may be a current measurement result and/or location estimation, for example, a measurement result and/or a location estimation that are/is latest obtained after trigger signaling is received; may be a last known measurement result and/or location estimation, for example, a recent measurement result and/or location estimation before trigger signaling is received; or may be an initial measurement result/or location estimation, for example, a measurement result and/or a location estimation in a start phase of call setup in an emergency positioning case; or may be a measurement result and/or a location estimation in a measurement time window. No enumeration is provided herein.

Optionally, the positioning measurement result and the location estimation result may be obtained by using an observed time difference of arrival (OTDOA), a global navigation satellite system (GNSS), a downlink time difference of arrival (DL-TDOA), an uplink time difference of arrival (UL-TDOA), an uplink angle of arrival (AoA), an angle of departure (AoD), Bluetooth, a sensor, or Wi-Fi.

Optionally, physical channels selected by different positioning state information may be different. For example, less information content (for example, absolute location information, event information, or other positioning state information) may be mapped to a PUCCH, and other information or more bits (for example, location measurement information) may only be mapped to a PUSCH.

(3) physical random access channel (PRACH) transmitted on a primary cell (PRACH transmission on the PCell).

(4) PUCCH carrying a hybrid automatic repeat request acknowledgement (HARQ-ACK) (PUCCH transmission with HARQ-ACK information).

(5) PUSCH carrying a HARQ-ACK (PUSCH transmission with HARQ-ACK information).

(6) PUCCH carrying a scheduling request (SR) (PUCCH transmission with SR).

(7) PUCCH carrying a link recovery request (LRR) (PUCCH transmission with LRR).

(8) PUCCH carrying channel state information (CSI) (PUCCH transmission with CSI).

(9) PUSCH carrying CSI (PUSCH transmission with CSI).

(10) PUSCH carrying no HARQ-ACK or CSI (PUSCH transmission without HARQ-ACK information or CSI).

(11) PUSCH transmitted on a primary cell in a Type-2 random access procedure (for Type-2 random access procedure, PUSCH transmission on the PCell).

(12) Multiple-input multiple-output SRS transmission (SRS_MIMO transmission).

It should be noted that before the sounding reference signal for positioning is proposed, an SRS transmission is a multiple-input multiple-output SRS transmission. After the sounding reference signal for positioning is proposed, the SRS transmission includes a positioning SRS transmission and a multiple-input multiple-output SRS transmission.

(13) PRACH transmitted on a serving cell other than the primary cell (PRACH transmission on a serving cell other than the PCell).

2. Power Allocation Priority

The UE may allocate powers to uplink transmissions in ascending order of the following priorities: a PUSCH, a PUCCH, a PRACH, an SRS, or the like:

(a) a PRACH transmitted on a primary cell;
(b) a PUCCH carrying a HARQ-ACK and/or an SR and/or an LRR, or a PUSCH carrying a HARQ-ACK;
(c) a PUCCH carrying CSI or PUSCH carrying CSI;
(d) a PUSCH carrying no HARQ-ACK or CSI, and/or a PUSCH transmitted on a primary cell in a Type-2 random access procedure; and
(e) an SRS transmission (a priority of an aperiodic SRS is higher than that of a semi-persistent SRS and/or a periodic SRS), or a PRACH transmitted on a serving cell other than the PCell.

The SRS transmission in (e) is a multiple-input multiple-output SRS transmission in the embodiments of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (NR) system for example purposes, and NR terms are used in most of the following descriptions, although these technologies can also be applied to an application other than an NR system application, for example, a 6-th generation (6G) communications system.

FIG. 1 is a block diagram of a wireless communications system to which embodiments of this application can be applied. The wireless communications system includes a terminal 11 and a network device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, glasses, and the like. It should be noted that a type of the terminal 11 is not limited in the embodiments of this application. The network device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a type of the base station is not limited. The core network device may be a location server, may be a location server (for example, Evolved Serving Mobile Location Centre (E-SMLC)) in LTE, may be a location server (for example, Location Management Function (LMF)) in NR, or may be a location server in a subsequent evolved version.

With reference to the accompanying drawings, a power allocation method provided in the embodiments of this application is described by using embodiments and application scenarios.

Usually, in a scenario in which there are at least two uplink transmissions on a single carrier or in the case of carrier aggregation (CA), if a total transmit power of a PUSCH, a PUCCH, a PRACH, a SRS, and the like transmitted by the UE in a plurality of serving cells in a frequency range on one transmission opportunity exceeds a transmit power threshold, the UE may re-allocate powers to these uplink transmissions, so that a total transmit power of the UE for transmission in the plurality of serving cells in the frequency range on each symbol of the transmission opportunity is less than or equal to the transmit power threshold.

In addition, in a wireless communications system, a positioning function is introduced. In uplink positioning, a function of an SRS is extended to be used for positioning. However, in the foregoing scenario, how to transmit an uplink transmission used for positioning is an urgent technical problem to be resolved.

FIG. 2 is a schematic flowchart of a power allocation method according to an embodiment of this application. As shown in FIG. 1, the power allocation method includes the following S200:

S200. In a case that a total transmit power of UE on a time domain unit is greater than a power threshold, the UE allocates a transmit power to an uplink transmission on the time domain unit according to a power allocation priority.

The uplink transmission on the time domain unit includes at least one of a sounding reference signal for positioning SRS_pos or positioning state information PSI, and the power allocation priority includes a power allocation priority of the uplink transmission on the time domain unit.

The power threshold may be a maximum transmit power ($\hat{P}_{CMAX}(i)$) of the UE in a frequency range (FR).

In this embodiment of this application, a time domain unit may be a symbol in a slot, or may be a smaller time unit.

It should be noted that the power allocation priority includes a power allocation priority of the SRS_pos and a power allocation priority of the PSI.

According to the power allocation method provided in this embodiment of this application, in a case that a total transmit power of UE on a time domain unit is greater than a power threshold, the UE may allocate a power to an uplink transmission on the time domain unit according to a power allocation priority. Because the power allocation priority includes a power allocation priority of the uplink transmission on the time domain unit, in a case that the uplink transmission on the time domain unit includes at least one of an SRS_pos or PSI, the UE may re-allocate a transmit power to the SRS_pos based on a power allocation priority of the SRS_pos, and may re-allocate a transmit power to the PSI based on a power allocation priority of the PSI, so that the UE can accurately allocate the transmit powers to the SRS_pos and the PSI. Therefore, in a positioning scenario, in a case that the total transmit power of the UE on the time domain unit is greater than the power threshold, the UE may correctly send a sounding reference signal for positioning or report positioning information.

Optionally, a power allocation priority of the uplink transmission on the time domain unit is indicated by a network device, predefined (for example, stipulated in a protocol), or selected by the UE.

For example, the power allocation priority of the SRS_pos is indicated by the network device, predefined, or selected by the UE, and the power allocation priority of the PSI is indicated by the network device, predefined, or selected by the UE.

Optionally, a relationship between each power allocation priority and a power allocation priority of each uplink transmission specified in the protocol may be specified in the protocol or indicated by the network device.

Exemplarily, a priority X is equal to a power allocation priority of an uplink transmission (for example, PUCCH carrying CSI or PUSCH transmission with CSI).

For example, the priority X is between power allocation priorities of uplink transmissions of two different priorities, (for example, between PUCCH carrying CSI or PUSCH carrying CSI and PUSCH carrying no HARQ-ACK or CSI).

The priority X may be the power allocation priority of the SRS_pos, or may be the power allocation priority of the PSI.

For example, the power allocation priority of the SRS_pos is indicated by the network device, is specified in the protocol, or is specified in the protocol and indicated by the network, and a manner of indicating a power allocation priority includes at least one of:

(1) Classify SRS_pos with a same power allocation priority or identifiers corresponding to SRS_pos into one group according to power allocation priorities.

One group includes at least one SRS_pos or an identifier corresponding to an SRS_pos.

Optionally, power allocation priorities of SRS_pos in a same group are the same.

Optionally, for SRS_pos in a same group, an order of power allocation priorities in the group may be distinguished according to the SRS_pos or identifiers corresponding to the SRS_pos or may be indicated by the network. It can be understood herein that the SRS_pos in the same group have a same large priority, and also have priorities in the group. For example, a group of SRS_pos belongs to one band, and priorities in the group are priorities of different SRS_pos in the band. For example, a group of SRS_pos are SRS_pos of a same type (periodic, aperiodic, or semi-persistent), and priorities in the group are a priority order of the SRS_pos of the same type. For example, priorities of a group of SRS_pos are priorities compared with other uplink transmissions (for example, CSI on PUSCH and CSI on PUCCH), and priorities in the group are only priorities of different SRS_pos. In summary, this group of SRS_pos have same characteristics, so that the group of SRS_pos have the same high priority, and there is a smaller priority order within the group. Optionally, the SRS_pos in the group may be stipulated by the protocol or indicated by the network. Optionally, power allocation priorities of the SRS_pos in the same group may be stipulated by the protocol or indicated by the network.

(2) When power allocation priorities of a plurality of SRS_pos are configured, an order of the SRS_pos or identifiers corresponding to the SRS_pos in the list may indicate a descending or ascending order of power allocation priorities.

(3) Power allocation priority order information is indicated in an information element (IE) associated with an SRS_pos.

For example, the IE associated with the SRS_pos indicates that the power allocation priority is "high", "medium", "low" or "0", "1", "2" . . .

Optionally, in this embodiment of this application, in a case that a power allocation priority of an SRS_pos is indicated, an identifier corresponding to the SRS_pos may be at least one of: an SRS resource identifier (SRS resource ID), an SRS resource set identifier (SRS resource set ID), a serving cell identifier (serving cell ID) in which an SRS is located, an bandwidth part (BWP) identifier (BWP ID) in which an SRS is located, a band identifier (band ID) or a band indicator in which the SRS is located, a center frequency location of an SRS, a positioning reference signal (PRS) identifier that is associated with the SRS_pos or overlaps/approaches a frequency domain location in round trip time (RTT) or multiple round trip time (Multi-RTT) positioning, or an SRS_pos type (periodic, aperiodic, or semi-persistent).

In this embodiment of this application, the center frequency location may include an absolute frequency location and a relative frequency location.

In this embodiment of this application, the PRS identifier may include at least one of: a PRS resource identifier, a PRS resource set identifier, a transmitting receiving point identifier, a positioning frequency layer identifier, a band identifier or a band indicator, a physical cell identifier (PCI), or an NR cell global identifier (NCGI).

For example, a power allocation priority of an SRS_pos is indicated by a band, and power allocation priorities of SRS_pos in a band are the same.

Tables 1 to 4 are exemplary tables in which the network device indicates, the protocol stipulates, or the protocol stipulates and the network device indicates a power allocation priority of an SRS_pos according to an embodiment of this application. The table is only a form of stipulating or indicating a priority, and other forms are not excluded in this solution. Table 1 indicates that at least one SRS_pos has a different power allocation priority (in a grouping manner). Table 2 indicates that each SRS_pos has a different power allocation priority. Table 3 indicates that power allocation priorities of at least one SRS_pos are the same. Table 4 indicates a power allocation priority of the SRS_pos as a whole, for example, a priority of an SRS for positioning.

TABLE 1

| Priority 1 | SRS_pos 1 and SRS_pos 2 |
| Priority 2 | SRS_pos 3 and SRS_pos 4 |
| Priority 3 | SRS_pos 5 and SRS_pos 6 |
| . . . | . . . |
| Priority N | SRS_pos M . . . |

TABLE 2

| Priority 1 | SRS_pos 1 |
| Priority 2 | SRS_pos 3 |
| Priority 3 | SRS_pos 2 |
| . . . | . . . |
| Priority N | SRS_pos M . . . |

TABLE 3

| Priority 1 | SRS_pos 1, SRS_pos 2 . . . |

TABLE 4

| Priority N | SRS_pos |

Optionally, in this embodiment of this application, the uplink transmission on the time domain unit may include one or more SRS_pos; and a power allocation priority of at least one of the one or more SRS_pos is indicated by a network device.

For example, a plurality of simultaneously transmitted SRS_pos are overlapping SRS resources on a same symbol on different uplink carriers.

Optionally, types (periodic, aperiodic, or semi-persistent) of different SRS_pos in a plurality of simultaneously transmitted SRS_pos may be the same or different.

In a possible implementation, a power allocation priority of an SRS_pos may be directly indicated by the location server, or may be recommended by the location server to the serving gNB, and then determined by the serving gNB and then indicated to the UE.

For example, the location server may determine power allocation priorities of SRS_pos according to a quantity of receiving TRPs corresponding to sending of different SRS_pos.

In this embodiment of this application, signaling between the location server and the UE includes but is not limited to one of: an LPP-LTE positioning protocol, an NR positioning protocol (NRPP), a combination of an NR positioning protocol a (NRPPa) and signaling between the gNB and the UE, or a combination of an LTE positioning protocol a (LPPa) and signaling between gNB and the UE.

In this embodiment of this application, signaling between the gNB and the UE includes but is not limited to one of: radio resource control (RRC), medium access control-control element (MAC CE), downlink control information (DCI), Msg1, Msg3, broadcast signaling, and paging, or a combination of the foregoing signaling.

In this embodiment of this application, signaling between the gNB and the location server includes but is not limited to one of: the LPPa or the NRPPa.

Optionally, in this embodiment of this application, in a case that the uplink transmission on the time domain unit includes a plurality of SRS_pos, power allocation priorities of the plurality of SRS_pos may use any one of the following possible implementations:

Priority rule 1: The power allocation priorities of the plurality of SRS_pos on the time domain unit are the same.

Priority rule 2: A power allocation priority of a first SRS_pos in the plurality of SRS_pos on the time domain unit is higher than power allocation priorities of other SRS_pos other than the first SRS_pos on the time domain unit.

The first SRS_pos is any one of the following (1) to (18):
(1) an SRS_pos in a primary cell (Pcell) in a master cell group (MCG);
(2) an SRS_pos in a primary cell (Pcell) in a secondary cell group (SCG);
(3) an SRS_pos in a cell in which no PUSCH is transmitted;
(4) an SRS_pos in a cell in which no PUCCH is transmitted;
(5) an SRS_pos in a cell in which no PUCCH is transmitted and no PUSCH is transmitted;
(6) an SRS_pos on an uplink carrier on which a non-supplementary uplink (SUL) is transmitted;
(7) an SRS_pos on an uplink carrier on which a PUCCH is transmitted;
(8) an SRS_pos on an uplink carrier on which a PUSCH is transmitted;
(9) an SRS_pos on an uplink carrier on which a PUCCH and a PUSCH are transmitted;
(10) an SRS_pos on a same band as a downlink positioning reference signal;
(11) an SRS_pos whose frequency domain location overlaps with a frequency domain location of a downlink positioning reference signal;
(12) an SRS_pos whose difference from a frequency domain location of a downlink positioning reference signal is within a preset range;
(13) an SRS_pos for which a path loss reference signal is configured;
(14) an SRS_pos for which a spatial relation reference signal is configured;
(15) an SRS_pos for which a path loss reference signal and a spatial relation reference signal are configured;
(16) an SRS_pos for which a path loss reference signal is configured and a measurement result of the path loss reference signal meets a first boundary condition (that is, an SRS_pos for which a path loss reference signal is configured and the path loss reference signal can be accurately measured);
(17) an SRS_pos for which a spatial relation signal is configured and a measurement result of the spatial relation reference signal meets a second boundary condition (that is, an SRS_pos for which a spatial relation signal is configured and the spatial relation reference signal can be accurately measured); or
(18) an SRS_pos for which a path loss reference signal is configured and a measurement result of the path loss reference signal meets a first boundary condition, and an SRS_pos for which a spatial relation reference signal is configured and a measurement result of the spatial relation reference signal meets a second boundary condition (that is, an SRS_pos for which a path loss reference signal and a spatial relation reference signal are configured and the two can be accurately measured).

For ease of illustration, in the following embodiments of this application, a power allocation priority of A is higher than a power allocation priority of B, which is denoted as A>B; the power allocation priority of A is equal to the power allocation priority of B, which is denoted as A=B; and the power allocation priority of A is less than the power allocation priority of B, which is denoted as A<B.

In an uplink CA scenario, power allocation priorities of a plurality of SRS_pos on a time domain unit may be the following example a1 or example a2.

Example a1: In the plurality of SRS_pos on the time domain unit, a power allocation priority of the SRS_pos in the primary cell of the master cell group or the secondary cell group is highest.

That is, the UE preferentially allocates a transmit power to the SRS_pos in the Pcell in the MCG or the SCG among the plurality of SRS_pos on the time domain unit.

Optionally, a power allocation priority of the SRS_pos in the primary cell of the master cell group MCG Pcell is higher than a power allocation priority of the SRS_pos in the primary cell of the secondary cell group (denoted as MCG Pcell>SCG Pcell).

Optionally, a power allocation priority of an SRS_pos in a secondary cell in the master cell group is higher than a power allocation priority of an SRS_pos in a secondary cell in the secondary cell group (denoted as MCG Scell>SCG Sell).

Optionally, a power allocation priority of an SRS_pos in a secondary cell in the master cell group is equal to a power allocation priority of an SRS_pos in a secondary cell in the secondary cell group (denoted as MCG Scell=SCG Sell).

Example a2: In the plurality of SRS_pos on the time domain unit, a power allocation priority of the SRS_pos in the cell in which no PUSCH (or no PUCCH) is transmitted is highest.

That is, a transmit power is preferentially allocated to the SRS_pos in the cell in which no PUSCH or no PUCCH is transmitted among the plurality of SRS_pos on the time domain unit.

In a single cell operation scenario with two uplink carriers (for single cell operation with two uplink carrier), the power allocation priorities of the plurality of SRS_pos on the time domain unit may be the following example b1, example b2, example b3, or example b4.

Example b1: In the plurality of SRS_pos on the time domain unit, a power allocation priority of the SRS_pos on the uplink carrier on which the PUCCH is transmitted is highest.

That is, a transmit power is preferentially allocated to the SRS_pos on the uplink carrier on which the PUCCH is transmitted among the plurality of SRS_pos on the time domain unit.

Example b2: In the plurality of SRS_pos on the time domain unit, a power allocation priority of the SRS_pos on the uplink carrier on which the non-SUL is transmitted is highest.

That is, a transmit power is preferentially allocated to the SRS_pos on the uplink carrier on which the non-SUL is transmitted among the plurality of SRS_pos on the time domain unit.

Example b3: In the plurality of SRS_pos on the time domain unit, a power allocation priority of the SRS_pos in the cell in which no PUSCH or no PUCCH is transmitted is highest.

That is, a transmit power is preferentially allocated to the SRS_pos in the cell in which no PUSCH or no PUCCH is transmitted among the plurality of SRS_pos on the time domain unit.

In an RTT or Multi-RTT positioning scenario, for the power allocation priorities of the plurality of SRS_pos on the time domain unit, refer to the following example c1, example c2, or example c3.

Example c1: In the plurality of SRS_pos on the time domain unit, a power allocation priority of the SRS_pos on the same band as the downlink positioning reference signal is highest.

For example, in this embodiment of this application, the downlink positioning reference signal may be a PRS.

For example, that bands are the same may be: IDs of the bands are the same and indicators of the bands are the same.

Example c2: In the plurality of SRS_pos on the time domain unit, a power allocation priority of the SRS_pos whose frequency domain location overlaps with a frequency domain location of the downlink positioning reference signal is highest.

The frequency domain location may be a center frequency, or may be a frequency domain location formed by a frequency domain start location and a bandwidth.

Optionally, that frequency domain locations overlap may be: center frequencies are the same, or may be start locations are the same and bandwidths are the same.

Example c3: In the plurality of SRS_pos on the time domain unit, a power allocation priority of the SRS_pos whose difference from the frequency domain location of the downlink positioning reference signal is within the preset range is highest.

It can be understood that, that a difference between frequency domain locations is within the preset range may indicate that frequency domain locations of two uplink transmissions are close to each other.

It should be noted that if the SRS_pos determined in the foregoing example c1, example c2, or example c3 includes a plurality of SRS_pos, power allocation priorities of the plurality of SRS_pos may be the same, or the power allocation priorities of the plurality of SRS_pos in the foregoing CA scenario or the foregoing single-carrier scenario with two uplink carriers may be used, or the network device indicate the power allocation priorities of the plurality of SRS_pos.

In a scenario in which a measurement signal associated with an SRS_pos is configured, for the power allocation priorities of the plurality of SRS_pos on the time domain unit, refer to the following example d1, example d2, or example d3.

Example d1: In the plurality of SRS_pos on the time domain unit, a power allocation priority of the SRS_pos for which the path loss reference signal is configured is highest.

Example d2: In the plurality of SRS_pos on the time domain unit, a power allocation priority of the SRS_pos for which the spatial relation reference signal is configured is highest.

Example d3: In the plurality of SRS_pos on the time domain unit, a power allocation priority of the SRS_pos for which the path loss reference signal and the spatial relation reference signal are configured is highest.

Example d4: In the plurality of SRS_pos on the time domain unit, a power allocation priority of the SRS_pos for which the path loss reference signal is configured and the path loss reference signal can be accurately measured is highest.

It should be noted that, provided that the boundary conditions for the measurement used for the path loss estimation are met, the UE's path loss measurement is considered accurate/reliable. For example, the measurement result is higher than a threshold. (The UE's path loss measurement is considered accurate/reliable, provided that the boundary conditions for the measurement used by the UE for the path loss estimation are met.)

Example d5: In the plurality of SRS_pos on the time domain unit, a power allocation priority of the SRS_pos for which the spatial relation signal is configured and the spatial relation reference signal can be accurately measured is highest.

Example d6: In the plurality of SRS_pos on the time domain unit, a power allocation priority of the SRS_pos for which a path loss reference signal and a spatial relation reference signal are configured and the two can be accurately measured is highest.

It should be noted that if the SRS_pos determined in the foregoing example d1, example d2, example d3, example d4, or example d5 includes a plurality of SRS_pos, power allocation priorities of the plurality of SRS_pos may be the same, or the power allocation priorities of the plurality of SRS_pos in the foregoing CA scenario or the foregoing single-carrier scenario with two uplink carriers may be used, or the network device indicate the power allocation priorities of the plurality of SRS_pos.

In this embodiment of this application, the plurality of SRS_pos on the time domain unit correspond to a plurality of uplink carriers. For example, the plurality of SRS_pos on the time domain unit may correspond to positioning SRS resources transmitted on the plurality of uplink carriers. One SRS_pos may correspond to a positioning SRS resource transmitted on one uplink carrier.

Priority rule 3: If an uplink carrier for transmitting a PUCCH does not exist in the plurality of uplink carriers corresponding to the plurality of SRS_pos on the time domain unit, a power allocation priority of a second SRS_pos in the plurality of SRS_pos on the time domain unit is higher than power allocation priorities of other SRS_pos.

The second SRS_pos is an SRS_pos on an uplink carrier on which a non-SUL is transmitted, and the other SRS_pos are SRS_pos other than the second SRS_pos in the plurality of SRS_pos on the time domain unit.

Example e1: In the plurality of SRS_pos on the time domain unit, where there is no PUCCH transmission, a power allocation priority of the SRS_pos on the uplink carrier on which the non-SUL is transmitted is highest.

That is, a transmit power is preferentially allocated to the SRS_pos on the uplink carrier on which the PUCCH is transmitted among the plurality of SRS_pos on the time domain unit, and if there is no SRS_pos on the uplink carrier on which the PUCCH is transmitted, a transmit power is preferentially allocated to the SRS_pos on the uplink carrier on which the non-SUL is transmitted.

Optionally, in this embodiment of this application, the uplink transmission on the time domain unit may include at least two of an aperiodic uplink transmission, a semi-persistent uplink transmission, or a periodic uplink transmission.

Optionally, power allocation priorities of at least two uplink transmissions of different period types may be determined according to at least one implementation of the following priority rule 4.

Priority rule 4:

4-1: A power allocation priority of the aperiodic uplink transmission is higher than or equal to a power allocation priority of the semi-persistent uplink transmission, and the power allocation priority of the semi-persistent uplink transmission is higher than or equal to a power allocation priority of the periodic uplink transmission.

4-2: A power allocation priority of the aperiodic uplink transmission is higher than or equal to a power allocation priority of the periodic uplink transmission, and the power allocation priority of the periodic uplink transmission is higher than or equal to a power allocation priority of the semi-persistent uplink transmission.

The uplink transmission on the time domain unit is an SRS_pos or PSI.

For ease of description, the aperiodic SRS_pos is denoted as a-SRS_pos, the semi-persistent SRS_pos is denoted as sp-SRS_pos, and the periodic SRS_pos is denoted as p-SRS_pos. Exemplarily, if the uplink transmission on the time domain unit includes a-SRS_pos, sp-SRS_pos, and p-SRS_pos, power allocation priorities of a-SRS_pos, sp-SRS_pos, and p-SRS_pos may be any one of the following examples.

Example d1: a-SRS_pos>sp-SRS_pos>p-SRS_pos.
Example d2: a-SRS_pos>sp-SRS_pos=p-SRS_pos.
Example d3: a-SRS_pos=sp-SRS_pos>p-SRS_pos.
Example d4: a-SRS_pos=sp-SRS_pos=p-SRS_pos.
Example d5: a-SRS_pos>p-SRS_pos>sp-SRS_pos.

It should be noted that in this solution, an example in which uplink transmissions are SRS_pos of different period types is used as an example for description. For PSI of different period types, refer to the example of the SRS_pos. Details are not described herein again.

Optionally, in this embodiment of this application, the uplink transmission on the time domain unit may include a first uplink transmission and a second uplink transmission. The first uplink transmission includes an aperiodic SRS_pos, a semi-persistent SRS_pos, or a periodic SRS_pos, and the second uplink transmission includes an aperiodic SRS_MIMO, a semi-persistent SRS_MIMO, or a periodic SRS_MIMO.

A power allocation priority of the first uplink transmission and a power allocation priority of the second uplink transmission may be determined by using at least one of the following priority rules 5.

Priority rule 5: The power allocation priority of the first uplink transmission is higher than or equal to the power allocation priority of the second uplink transmission.

For example, in a case that period types of the first uplink transmission and the second uplink transmission are the same, the power allocation priority of the first uplink transmission is higher than or equal to or lower than the power allocation priority of the second uplink transmission. In a case that period types of the first uplink transmission and the second uplink transmission are different, the power allocation priority of the first uplink transmission is higher than or equal to or lower than the power allocation priority of the second uplink transmission.

Example e1: a-SRS_pos>a-SRS_MIMO; or a-SRS_pos=a-SRS_MIMO; or a-SRS_pos<a-SRS_MIMO.

Example e2: a-SRS_pos>sp-SRS_MIMO; or a-SRS_pos=sp-SRS_MIMO; or a-SRS_pos<sp-SRS_MIMO.

Example e3: a-SRS_pos>p-SRS_MIMO; or a-SRS_pos=p-SRS_MIMO; or a-SRS_pos<p-SRS_MIMO.

Example e4: sp-SRS_pos>a-SRS_MIMO; or sp-SRS_pos=a-SRS_MIMO; or sp-SRS_pos<a-SRS_MIMO.

Example e5: sp-SRS_pos>sp-SRS_MIMO; or sp-SRS_pos=sp-SRS_MIMO; or sp-SRS_pos<sp-SRS_MIMO.

Example e6: sp-SRS_pos>p-SRS_MIMO; or sp-SRS_pos=p-SRS_MIMO; or sp-SRS_pos<p-SRS_MTMO.

Example e7: p-SRS_pos>a-SRS_MIMO; or p-SRS_pos=a-SRS_MIMO; or p-SRS_pos<a-SRS_MIMO.

Example e8: p-SRS_pos>sp-SRS_MIMO; or p-SRS_pos=sp-SRS_MIMO; or p-SRS_pos<sp-SRS_MIMO.

Example e9: p-SRS_pos>p-SRS_MIMO; or p-SRS_pos=p-SRS_MIMO; or p-SRS_pos<p-SRS_MIMO.

It should be noted that, when a period type of an SRS_pos is different from a period type of an SRS_MIMO, power allocation priorities cannot be inconsistent with power allocation priorities of SRS_pos (or SRS_MIMO) signals of different period types in comparison with a separate SRS_pos (or SRS_MIMO).

For example, if a-SRS_MIMO>a-SRS_pos and a-SRS_pos>p-SRS_pos, p-SRS_pos> or =a-SRS_MIMO cannot occur.

In this solution, power allocation priorities of the first uplink transmission and the second uplink transmission included in the uplink transmission on the time domain unit may be indicated by the network device, stipulated in the protocol, or selected by the UE.

For example, being indicated by the network device may be being indicated by a serving gNB.

Optionally, the serving gNB may indicate power allocation priorities of the SRS_pos and the SRS_MIMO according to a frequency of a band or a serving cell.

Optionally, the serving gNB may determine, according to a power allocation priority of the SRS_pos indicated by a location server in "a plurality of simultaneously transmitted SRS_pos" and with reference to the SRS_MIMO, the power allocation priorities of the SRS_pos and the SRS_MIMO when the SRS_pos and the SRS_MIMO are simultaneously transmitted.

Optionally, in this embodiment of this application, the uplink transmission on the time domain unit includes PSI carried on a PUSCH (denoted as PUSCH transmission with PSI) and PSI carried on a PUCCH (denoted as PUCCH transmission with PSI). Power allocation priorities of a plurality of pieces of PSI may be any one of the following priority rules 6.

Priority rule 6: A power allocation priority of the PSI carried on the PUSCH is lower than a power allocation priority of the PSI carried on the PUCCH.

Example f1: PUSCH transmission with PSI=PUCCH transmission with PSI.

Example f2: PUSCH transmission with PSI>PUCCH transmission with PSI.

Example f3: PUSCH transmission with PSI<PUCCH transmission with PSI.

Optionally, in this embodiment of this application, the uplink transmission on the time domain unit includes at least two of: aperiodic PSI carried on a PUSCH (denoted as aperiodic PSI on PUSCH), semi-persistent PSI carried on a PUSCH (denoted as semi-persistent PSI on PUSCH), periodic PSI carried on a PUSCH (denoted as periodic PSI on PUSCH), semi-persistent PSI carried on a PUCCH (denoted as semi-persistent PSI on PUCCH), or periodic PSI carried on a PUCCH (denoted as Periodic PSI on PUCCH).

It should be noted that, if the time domain unit includes the foregoing five types of PSI, power allocation priorities of the five types of PSI may be any permutation and combination of: all are different, two are the same, three are the same, four are the same, and all are the same.

For example, at least one of the following priority rules 7 may be used for priorities of at least two pieces of PSI on the time domain unit.

Priority rule 7:

7-1: A power allocation priority of the aperiodic PSI carried on the PUSCH is higher than or equal to a power allocation priority of the semi-persistent PSI carried on the PUSCH.

7-2: The power allocation priority of the semi-persistent PSI carried on the PUSCH is higher than or equal to a power allocation priority of the semi-persistent PSI carried on the PUCCH.

7-3: The power allocation priority of the semi-persistent PSI carried on the PUCCH is higher than or equal to a power allocation priority of the periodic PSI carried on the PUCCH.

7-4: The power allocation priority of the periodic PSI carried on the PUCCH is higher than or equal to a power allocation priority of the periodic PSI carried on the PUSCH.

Example g1: aperiodic PSI on PUSCH>semi-persistent PSI on PUSCH>semi-persistent PSI on PUCCH>periodic PSI on PUCCH>periodic PSI on PUSCH.

Example g2: aperiodic PSI on PUSCH=semi-persistent PSI on PUSCH>semi-persistent PSI on PUCCH>periodic PSI on PUCCH>periodic PSI on PUSCH.

Example g3: aperiodic PSI on PUSCH=semi-persistent PSI on PUSCH=semi-persistent PSI on PUCCH>periodic PSI on PUCCH>periodic PSI on PUSCH.

Example g4: aperiodic PSI on PUSCH=semi-persistent PSI on PUSCH=semi-persistent PSI on PUCCH=periodic PSI on PUCCH>periodic PSI on PUSCH.

Example g5: aperiodic PSI on PUSCH=semi-persistent PSI on PUSCH=semi-persistent PSI on PUCCH=periodic PSI on PUCCH=periodic PSI on PUSCH.

Optionally, when only priorities lower than priorities of the five types of PSI are compared, a relationship between the priorities lower than the priorities of the five types of PSI may be obtained according to a pass relationship of the foregoing priority orders.

Optionally, when PSI types includes K (1<K<=N) of the foregoing five PSI types, a priority relationship between the K PSI types may be obtained according to the pass relationship of the foregoing priority order.

Optionally, in this embodiment of this application, the uplink transmission on the time domain unit includes at least two of: aperiodic PSI carried on a dynamic grant PUSCH, semi-persistent PSI carried on a dynamic grant PUSCH, periodic PSI carried on a dynamic grant PUSCH, aperiodic PSI carried on a grant-free (configure grant) PUSCH, semi-persistent PSI carried on a grant-free PUSCH, periodic PSI carried on a grant-free PUSCH, semi-persistent PSI carried on a PUCCH, or periodic PSI carried on a PUCCH.

It should be noted that, if the time domain unit includes the foregoing eight types of PSI, power allocation priorities of the eight types of PSI may be any permutation and combination of: all are different, two are the same, three are the same, four are the same, five are the same, six are the same, seven are the same, and all are the same.

For example, at least one of the following priority rules 8 may be used for priorities of at least two pieces of PSI on the time domain unit.

Priority rule 8:

8-1. A power allocation priority of the aperiodic PSI carried on the dynamic grant PUSCH is higher than or equal to a power allocation priority of the aperiodic PSI carried on the grant-free PUSCH.

8-2. The power allocation priority of the aperiodic PSI carried on the grant-free PUSCH is higher than or equal to a power allocation priority of the semi-persistent PSI carried on the dynamic grant PUSCH.

8-3: The power allocation priority of the semi-persistent PSI carried on the dynamic grant PUSCH is higher than or equal to a power allocation priority of the semi-persistent PSI carried on the grant-free PUSCH.

8-4: The power allocation priority of the semi-persistent PSI carried on the grant-free PUSCH is higher than or equal to a power allocation priority of the semi-persistent PSI carried on the PUCCH.

8-5: The power allocation priority of the semi-persistent PSI carried on the PUCCH is higher than or equal to a power allocation priority of the periodic PSI carried on the PUCCH.

8-6: The power allocation priority of the periodic PSI carried on the PUCCH is higher than or equal to a power allocation priority of the periodic PSI carried on the grant-free PUSCH.

Example h1: aperiodic PSI on dynamic grant PUSCH>aperiodic PSI on configure grant PUSCH>semi-persistent PSI on dynamic grant PUSCH>semi-persistent PSI on configure grant PUSCH>semi-persistent PSI on configure grant PUCCH>semi-persistent PSI on PUSCH>periodic PSI on PUCCH>periodic PSI on configure grant PUSCH.

Example h2: aperiodic PSI on dynamic grant PUSCH=aperiodic PSI on configure grant PUSCH>semi-persistent PSI on dynamic grant PUSCH>semi-persistent PSI on configure grant PUSCH>semi-persistent PSI on configure grant PUCCH>semi-persistent PSI on PUSCH>periodic PSI on PUCCH>aperiodic PSI on configure grant PUSCH.

Example h3: aperiodic PSI on dynamic grant PUSCH=aperiodic PSI on configure grant PUSCH=semi-persistent PSI on dynamic grant PUSCH=semi-persistent PSI on configure grant PUSCH=semi-persistent PSI on configure grant PUCCH=semi-persistent PSI on PUSCH=periodic PSI on PUCCH=periodic PSI on configure grant PUSCH.

Optionally, when only priorities lower than priorities of the eight types of PSI are compared, a relationship between the priorities lower than the priorities of the eight types of PSI may be obtained according to a pass relationship of the foregoing priority order.

Optionally, when PSI types includes K (1<K<=N) of the foregoing eight PSI types, a priority relationship between the K PSI types may be obtained according to the pass relationship of the foregoing priority order.

Optionally, when the network device indicates that a priority of a PUSCH carrying PSI is high (for example, PUSCH with a priority index 1), a power allocation priority of the PUSCH carrying the PSI is high. For example, aperiodic PSI on dynamic grant PUSCH>aperiodic PSI on configure grant PUSCH>semi-persistent PSI on dynamic grant PUSCH>semi-persistent PSI on configure grant PUSCH>semi-persistent PSI on PUSCH>semi-persistent PSI on configure grant PUCCH>periodic PSI on PUCCH>periodic PSI on PUSCH.

Optionally, if only a grant-free PUSCH carrying PSI is compared with a grant-free PUSCH carrying PSI, a power allocation priority of the grant-free PUSCH carrying the PSI is higher than or equal to that of the grant-free PUSCH carrying the PSI.

Optionally, a grant-free scheduled PUSCH includes a grant-free type1 PUSCH and grant-free type2 PUSCH.

Optionally, in this embodiment of this application, an uplink transmission on a time domain unit includes at least two of: aperiodic PSI carried on a dynamic grant PUSCH, semi-persistent PSI carried on a dynamic grant PUSCH, aperiodic PSI carried on a grant-free type1 PUSCH, semi-persistent PSI carried on a grant-free type1 PUSCH, periodic PSI carried on a grant-free type1 PUSCH, aperiodic PSI carried on a grant-free type2 PUSCH, semi-persistent PSI carried on a grant-free type2 PUSCH, periodic PSI carried on a grant-free type2 PUSCH, semi-persistent PSI carried on a PUCCH, or periodic PSI carried on a PUCCH.

It should be noted that if the time domain unit includes the foregoing ten types of PSI, power allocation priorities of the ten types of PSI may be any permutation and combination of: all are different, two are the same, three are the same, four are the same, five are the same, six are the same, seven are the same, the eight are the same, nine are the same, and all are the same.

For example, at least one of the following priority rules 9 may be used for power allocation priorities of at least two pieces of PSI on the time domain unit.

Priority rule 9:

9-1. A power allocation priority of the aperiodic PSI carried on the dynamic grant PUSCH is higher than or equal to a power allocation priority of the aperiodic PSI carried on the grant-free type2 PUSCH.

9-2: The power allocation priority of the aperiodic PSI carried on the grant-free type2 PUSCH is higher than or equal to a power allocation priority of the aperiodic PSI carried on the grant-free type1 PUSCH;

9-3. The power allocation priority of the aperiodic PSI carried on the grant-free type1 PUSCH is higher than or equal to a power allocation priority of the semi-persistent PSI carried on the dynamic grant PUSCH.

9-4: The power allocation priority of the semi-persistent PSI carried on the dynamic grant PUSCH is higher than or equal to a power allocation priority of the semi-persistent PSI carried on the grant-free type2 PUSCH.

9-5: The power allocation priority of the semi-persistent PSI carried on the grant-free type2 PUSCH is higher than or equal to a power allocation priority of the semi-persistent PSI carried on the grant-free type1 PUSCH.

9-6: The power allocation priority of the semi-persistent PSI carried on the grant-free type1 PUSCH is higher than or equal to a power allocation priority of the semi-persistent PSI carried on the PUCCH.

9-7: The power allocation priority of the semi-persistent PSI carried on the PUCCH is higher than or equal to a power allocation priority of the periodic PSI carried on the PUCCH.

9-8: The power allocation priority of the periodic PSI carried on the PUCCH is higher than or equal to a power allocation priority of the periodic PSI carried on the grant-free type2 PUSCH 9-9: The power allocation priority of the periodic PSI carried on the grant-free type2 PUSCH is higher than or equal to a power allocation priority of the periodic PSI carried on the grant-free type1 PUSCH.

Example i1: aperiodic PSI on dynamic grant PUSCH>aperiodic PSI on configure grant type2 PUSCH>aperiodic PSI on configure grant type1 PUSCH>semi-persistent PSI on dynamic grant PUSCH>semi-persistent PSI on configure grant type2 PUSCH>semi-persistent PSI on configure grant type1 PUSCH>semi-persistent PSI on configure grant type1 PUCCH>periodic PSI on PUCCH>periodic PSI on configure grant type2 PUSCH>periodic PSI on configure grant type1 PUSCH.

Example i2: aperiodic PSI on dynamic grant PUSCH>aperiodic PSI on configure grant type2 PUSCH>aperiodic PSI on configure grant type1 PUSCH>semi-persistent PSI on dynamic grant PUSCH>semi-persistent PSI on configure grant type2 PUSCH>semi-persistent PSI on configure grant type1 PUSCH>semi-persistent PSI on configure grant type1 PUCCH>periodic PSI on configure grant type2 PUSCH>periodic PSI on configure grant type1 PUSCH>periodic PSI on PUCCH.

Optionally, when only priorities lower than priorities of the ten types of PSI are compared, a relationship between the priorities lower than the priorities of the ten types of PSI may be obtained according to a pass relationship of the foregoing priority orders.

Optionally, when PSI types includes K (1<K<=N) of the foregoing ten PSI types, a priority relationship between the K PSI types may be obtained according to the pass relationship of the foregoing priority order.

Optionally, when the network device indicates that a priority of a PUSCH carrying PSI is high (for example, PUSCH with a priority index 1), a power allocation priority of the PUSCH carrying the PSI is high. For example, aperiodic PSI on dynamic grant PUSCH>aperiodic PSI on configure grant type2 PUSCH>aperiodic PSI on configure grant type1 PUSCH>semi-persistent PSI on dynamic grant PUSCH>semi-persistent PSI on configure grant type2 PUSCH>semi-persistent PSI on configure grant type1 PUSCH>periodic PSI on configure grant type2 PUSCH>periodic PSI on configure grant type1 PUSCH>semi-persistent PSI on configure grant type1 PUCCH>periodic PSI on PUCCH.

Optionally, if only a grant-free type1 PUSCH carrying PSI is compared with a grant-free type2 PUSCH carrying PSI, a power allocation priority of the grant-free type2 PUSCH carrying the PSI is higher than or equal to that of the grant-free type1 PUSCH carrying the PSI.

Optionally, in the power allocation method provided in this embodiment of this application, the uplink transmission on the time domain unit may further include a third uplink transmission, and the third uplink transmission is an uplink transmission different from an SRS_pos and PSI.

For example, the third uplink transmission may include at least one of: a PRACH transmitted on a primary cell, a PUCCH carrying a HARQ-ACK, a PUSCH carrying a HARQ-ACK, a PUCCH carrying an SR, a PUCCH carrying an LRR, a PUCCH carrying CSI, a PUSCH carrying CSI, a PUSCH transmitted on a primary cell in a Type-2 random access procedure, an SRS_MIMO, or a PRACH transmitted on a serving cell other than the primary cell.

Optionally, in the power allocation method provided in this embodiment of this application, the third uplink transmission includes at least two uplink transmissions with different power allocation priorities. In a case that the SRS_pos and the third uplink transmission are included in the time domain unit, or the PSI and the third uplink transmission are included in the time domain unit, power allocation priorities on the time domain unit may be determined according to any one of the following priority rules 10.

Priority rule 10:

10-1: A power allocation priority of the SRS_pos (PSI) on the time domain unit is higher than or equal to a highest power allocation priority in at least two power allocation priorities.

10-2: A power allocation priority of the SRS_pos (PSI) on the time domain unit is lower than or equal to a lowest power allocation priority in at least two power allocation priorities.

10-3: A power allocation priority of the SRS_pos (PSI) on the time domain unit is between any two adjacent power allocation priorities in at least two power allocation priorities.

The at least two power allocation priorities are power allocation priorities of the at least two uplink transmissions.

For example, in a case that the uplink transmission on the time domain unit includes the SRS_pos and the third uplink transmission, power allocation priorities of third uplink transmissions on the time domain unit may include at least one of the following in descending order:
A1. a PRACH transmitted on a primary cell;
A2. a PUCCH carrying a HARQ-ACK and/or an SR and/or an LRR, or a PUSCH carrying a HARQ-ACK;
A3. a PUSCH carrying CSI or a PUSCH carrying CSI;
A4. a PUSCH carrying no HARQ-ACK or CSI, and/or a PUSCH transmitted on a primary cell in a Type-2 random access procedure; or
A5. a PRACH transmitted on a serving cell other than the primary cell.

For example, the power allocation priority of the SRS_pos may be the same as a power allocation priority of any one of the foregoing A1 to A5; the power allocation priority of the SRS_pos may be higher than a power allocation priority of A1; the power allocation priority of the SRS_pos may be lower than a power allocation priority of A5; or the power allocation priority of the SRS_pos may be between any two adjacent power allocation priorities in A1 to A5, for example, between A1 and A2, between A2 and A3, between A3 and A4, or between A4 and A5.

For example, in a case that the uplink transmission on the time domain unit includes the SRS_pos and the third uplink transmission, power allocation priorities of third uplink transmissions on the time domain unit include at least one of the following in descending order:
B1. a PRACH transmitted on a primary cell;
B2. a PUCCH carrying a HARQ-ACK and/or an SR and/or an LRR, or a PUSCH carrying a HARQ-ACK;
B3. a PUSCH carrying CSI or a PUSCH carrying CSI;
B4. a PUSCH carrying no HARQ-ACK or CSI, and/or a PUSCH transmitted on a primary cell in a Type-2 random access procedure;
B5. an SRS_MIMO transmission or a PRACH transmitted on a serving cell other than the primary cell; or
B6. an SRS_pos.

For example, the power allocation priority of the PSI may be the same as a power allocation priority of any one of the foregoing B1 to B6; the power allocation priority of the PSI may be higher than a power allocation priority of B1; the power allocation priority of the PSI may be lower than a power allocation priority of B6; or the power allocation priority of the PSI may be between any two adjacent power allocation priorities in B1 to B6, for example, between B1 and B2, between B2 and B3, between B3 and B4, between B4 and B5, or between B5 and B6.

Power allocation priorities of the PSI and the third uplink transmission may be in one of the following manners:

Manner 1:
a PRACH transmitted on a primary cell;
a PUCCH carrying a HARQ-ACK and/or an SR and/or an LRR, or a PUSCH carrying a HARQ-ACK;
a PUCCH carrying CSI or a PUSCH carrying CSI;
a PUCCH carrying PSI or a PUSCH carrying PSI;
a PUSCH carrying no HARQ-ACK or CSI, and/or a PUSCH transmitted on a primary cell in a Type-2 random access procedure; and
. . . (without affecting sorting of power allocation priorities of the following uplink transmissions)

Manner 2:
a PRACH transmitted on a primary cell;
a PUCCH carrying a HARQ-ACK and/or an SR and/or an LRR, or a PUSCH carrying a HARQ-ACK;
a PUCCH carrying CSI, a PUSCH carrying CSI, a PUCCH carrying PSI, or a PUSCH carrying PSI;
a PUSCH carrying no HARQ-ACK or CSI, and/or a PUSCH transmitted on a primary cell in a Type-2 random access procedure; and
. . . (without affecting sorting of power allocation priorities of the following uplink transmissions)

Manner 3:
a PRACH transmitted on a primary cell;
a PUCCH carrying a HARQ-ACK and/or an SR and/or an LRR, or a PUSCH carrying a HARQ-ACK;
a PUCCH carrying CSI or a PUSCH carrying CSI;
a PUSCH carrying no HARQ-ACK or CSI, and/or a PUSCH transmitted on a primary cell in a Type-2 random access procedure, or a PUCCH carrying PSI or a PUSCH carrying PSI; and
. . . (without affecting sorting of power allocation priorities of the following uplink transmissions)

Manner 4:
. . . (without affecting sorting of power allocation priorities of the foregoing uplink transmissions)
an SRS transmission, where a priority of an aperiodic SRS_MIMO has a higher priority than that of a semi-persistent and/or periodic SRS_MIMO, or a PRACH transmitted on a serving cell other than the primary cell; and
an SRS_pos transmission, where an aperiodic SRS_pos has a higher priority than that of a semi-persistent and/or periodic SRS_pos.

Manner 5:
. . . (without affecting sorting of power allocation priorities of the foregoing uplink transmissions)
an SRS_MIMO transmission (an aperiodic SRS_MIMO has a higher priority than a semi-persistent and/or a periodic SRS_MIMO), or a PRACH transmitted on a serving cell other than the PCell or an SRS_pos transmission (an aperiodic SRS_pos has a higher priority than a semi-persistent and/or periodic SRS_pos).

Optionally, in the power allocation method provided in this embodiment of this application, the uplink transmission on the time domain unit includes a plurality of uplink transmissions. The method further includes the following S201:

S201: If a power allocation priority of one uplink transmission of the plurality of uplink transmissions is higher than a preset power allocation priority, the UE does not drop the one uplink transmission.

Optionally, the preset power allocation priority may be indicated by a network device or stipulated in a protocol.

In this embodiment of this application, the preset power allocation priority may be a priority level.

It can be understood that if a power allocation priority of an uplink transmission is higher than or equal to a priority level (that is, the preset power allocation priority), if a total transmit power of the UE on a symbol of a slot (that is, a time domain unit) exceeds a threshold (that is, the power threshold), the network device indicates or the protocol stipulates that the UE cannot drop the uplink transmission.

Optionally, in the power allocation method provided in this embodiment of this application, in a case that the network device does not indicate a power allocation priority of an uplink transmission (at least one of the SRS_pos or the PSI), the power allocation priority of the uplink transmission may be determined according to any one of the following priority rules 11.

Priority rule 11:

11-1: The power allocation priority of the uplink transmission is a lowest power allocation priority in power allocation priorities of all uplink transmissions on the time domain unit.

11-2: The power allocation priority of the uplink transmission is a highest power allocation priority in power allocation priorities of all uplink transmissions on the time domain unit.

11-3: If the uplink transmission is an SRS_pos in a primary cell of a master cell group or an SRS_pos in a primary cell of a secondary cell group, a power allocation priority of the SRS_pos is a highest power allocation priority in power allocation priorities of all uplink transmissions on the time domain unit.

Optionally, in the power allocation method provided in this embodiment of this application, the uplink transmission on the time domain unit includes a plurality of uplink transmissions with a same power allocation priority. S200 may be performed through the following S200a:

S200a. The UE reduces a transmit power of each of the plurality of uplink transmissions with the same power allocation priority on the time domain unit according to a preset proportion.

Optionally, the preset proportion may be an equal proportion, or may be a non-equal proportion. This is not limited in this embodiment of this application.

Exemplarily, power allocation priorities of an SRS_pos1 and an SRS_pos2 are the same. When the SRS_pos1 and the SRS_pos2 are transmitted on different carriers on a same symbol, if a sum of linear powers of the SRS_pos1 and the SRS_pos2 exceeds a maximum power threshold, the UE may reduce transmit powers of the SRS_pos1 and the SRS_pos2 according to a preset proportion, for example, (SRS_pos1+SRS_pos2)/maximum power threshold, so that the sum of the linear powers of the SRS_pos1 and the SRS_pos2 is less than or equal to the maximum power threshold.

Optionally, in the power allocation method provided in this embodiment of this application, the uplink transmission on the time domain unit includes a plurality of uplink transmissions with different power allocation priorities. S200 may be performed through the following S200b, or may be performed through the following S200c1 and S200c2:

S200b. The UE sequentially allocates, according to power allocation priorities, transmit powers to the plurality of uplink transmissions with different power allocation priorities on the time domain unit without power reduction, and allocate a remaining transmit power to a fourth uplink transmission when the remaining transmit power is less than a transmit power required for the fourth uplink transmission in the plurality of uplink transmissions with different power allocation priorities.

It can be understood that the UE may preferentially allocate powers in an order of power allocation priorities without power reduction until a power cannot be allocated to an uplink transmission of a power allocation priority (denoted as a priority Y) without power reduction.

Optionally, when one uplink transmission corresponds to a power allocation priority (the priority Y), the UE sends the uplink transmission according to a remaining power.

Optionally, when a plurality of uplink transmissions correspond to a power allocation priority (the priority Y), the UE allocates powers to the plurality of uplink transmissions on average according to a remaining power (that is, the UE averages the remaining transmit power to send the plurality of uplink transmissions), or the UE allocates transmit powers to the plurality of uplink transmissions according to a preset proportion (that is, the UE sends the plurality of uplink transmissions according to a remaining transmit power and a required power proportion).

Optionally, if an uplink transmission whose power allocation priority is lower than a power allocation priority of the fourth uplink transmission exists in uplink transmissions on a time domain unit, the UE drops another uplink transmission whose power allocation priority is lower than a power allocation priority of the fourth uplink transmission.

S200c1. The UE allocates a weight coefficient to each uplink transmission on the time domain unit according to a power allocation priority.

S200c2. For each of the plurality of uplink transmissions with different power allocation priorities, the UE allocates a transmit power to an uplink transmission according to an original power of the uplink transmission and a weight coefficient of the uplink transmission.

For example, the UE may first allocate the weight coefficient to each uplink transmission in descending order of power allocation priorities, and then re-determine a transmit power of each uplink transmission according to an original power and a weight coefficient of each uplink transmission (for example, multiplying).

A weight coefficient or a weight coefficient table is related to an order of power allocation priorities, a weight coefficient of an uplink transmission with a high power allocation priority is high, a weight coefficient of an uplink transmission with a low priority is low, and weight coefficients of uplink transmissions with a same power allocation priority are the same.

Optionally, the weight coefficient or the weight coefficient table may be stipulated in a protocol, indicated by a network device, or selected by the terminal.

For example, a power allocation manner in S200b is referred to as a manner without power reduction, and a power allocation manner in S200c1 and the S200c2 is referred to as a weight coefficient manner.

Optionally, if a power allocation priority of an uplink transmission on the time domain unit is higher than or equal to a preset power allocation priority (for example, a priority threshold) of a fifth uplink transmission, a manner in which the UE allocates a power to the fifth uplink transmission may be the following A1, A2, or A3:

A1. If the total transmit power of the UE does not exceed the maximum power threshold, the UE does not reduce the transmit power of the fifth uplink transmission.

If the total transmit power of the UE exceeds the maximum power threshold, the power is allocated to the fifth uplink transmission according to the following A2 or A3.

A2. A weight coefficient is allocated in an order of power allocation priorities, and the UE determines, according to an original a power allocation weight coefficient, the transmit power to be allocated to the fifth uplink transmission.

A3. In an order of power allocation priorities, the UE preferentially allocates the power to the fifth uplink transmission without reducing the transmit power until a transmit power cannot be allocated to an uplink transmission of a power allocation priority (denoted as a first priority) without power reduction.

Optionally, a power allocation priority threshold may be specified in the protocol or indicated by the network or selected by the terminal.

Optionally, if a sixth uplink transmission whose power allocation priority is lower than or equal to the preset power allocation priority and is not lower than the power allocation priority threshold exists in uplink transmissions on the time domain unit, the UE may allocate a transmit power to the sixth uplink transmission in the foregoing weight coefficient manner.

Optionally, if a seventh uplink transmission whose power allocation priority is higher than or equal to the power allocation priority threshold exists in uplink transmissions on the time domain unit, the UE does not drop the seventh uplink transmission.

Optionally, if an eighth uplink transmission whose power allocation priority is lower than the power allocation priority threshold exists in uplink transmissions on the time domain unit, the UE allocates a transmit power to the eighth uplink transmission in any one of the following power allocation manners.

B1: The UE drops all of the eighth uplink transmissions.

It can also be understood that a transmit power allocated by the UE to an uplink transmission whose power allocation priority is lower than the power allocation priority threshold is 0.

B2. After the UE allocates the transmit power to the seventh uplink transmission, if there is no remaining transmit power, the UE drops the eighth uplink transmission.

After the UE allocates the transmit power to the seventh uplink transmission, if there is a remaining transmit power, the UE allocates the transmit power to the eighth uplink transmission in a manner C1 or C2.

C1: The UE allocates the transmit power to the eighth uplink transmission in a weight coefficient manner.

C2: The UE preferentially allocates the power to the eighth uplink transmission without power reduction until a power cannot be allocated to an uplink transmission of a priority (denoted as a second priority) without power reduction.

Optionally, the UE allocates a transmit power to an uplink transmission whose priority is equal to the second priority and lower than the second priority in the weight coefficient manner.

In this embodiment of this application, after the UE drops an uplink transmission, a behavior of the UE or the network device may be as follows:

After the UE drops the uplink transmission, the UE may indicate the event to the network device (a serving gNB or LMF).

Optionally, the UE may report a reason for dropping the uplink transmission. For example, if the UE reports that a total uplink transmit power exceeds a maximum threshold, the uplink transmission is dropped, or if a power allocation priority of the uplink transmission is lower, the uplink transmission is dropped.

Optionally, when the dropped uplink transmission is an SRS_pos, the UE may indicate an identifier of the SRS_pos to the network device.

Optionally, the network device may indicate the dropped SRS_pos to a gNB in which a neighboring cell participates in positioning, to reduce a waste of reserved resources.

Optionally, the network device may indicate the reason for dropping the uplink transmission.

It should be noted that the power allocation method provided in the embodiments of this application may be performed by a power allocation apparatus, or a control module that is in the power allocation apparatus and that is configured to perform the power allocation method. In this embodiment of this application, an example in which the power allocation apparatus performs the power allocation method is used to describe the power allocation apparatus provided in the embodiments of this application.

FIG. 3 is a possible schematic structural diagram of a power allocation apparatus according to an embodiment of this application. As shown in FIG. 3, a power allocation apparatus 300 includes a power allocation module 301. The power allocation module 301 is configured to: in a case that a total transmit power of UE on a time domain unit is greater than a power threshold, allocate a transmit power to an uplink transmission on the time domain unit according to a power allocation priority, where the uplink transmission includes at least one of an SRS_pos and PSI, and the power allocation priority includes a power allocation priority of the uplink transmission.

Optionally, the uplink transmission on the time domain unit includes a plurality of SRS_pos; and power allocation priorities of the plurality of SRS_pos are the same.

Optionally, the uplink transmission on the time domain unit includes a plurality of SRS_pos; and a power allocation priority of a first SRS_pos in the plurality of SRS_pos is higher than power allocation priorities of other SRS_pos, where the other SRS_pos are SRS_pos other than the first SRS_pos in the plurality of SRS_pos.

Optionally, the first SRS_pos is any one of: an SRS_pos in a primary cell of a master cell group; an SRS_pos in a primary cell of a secondary cell group; an SRS_pos in a cell in which no PUSCH is transmitted; an SRS_pos in a cell in which no PUCCH is transmitted; an SRS_pos in a cell in which no PUCCH is transmitted and no PUSCH is transmitted; an SRS_pos on an uplink carrier on which a non-SUL is transmitted; an SRS_pos on an uplink carrier on which a PUCCH is transmitted; an SRS_pos on an uplink carrier on which a PUSCH is transmitted; an SRS_pos on an uplink carrier on which a PUCCH and a PUSCH are transmitted; an SRS_pos on a same band as a downlink positioning reference signal; an SRS_pos whose frequency domain location overlaps with a frequency domain location of a downlink positioning reference signal; an SRS_pos whose difference from a frequency domain location of a downlink positioning reference signal is within a preset range; an SRS_pos for which a path loss reference signal is configured; an SRS_pos for which a spatial relation reference signal is configured; an SRS_pos for which a path loss reference signal and a spatial relation reference signal are configured; an SRS_pos for which a path loss reference signal is configured and a measurement result of the path loss reference signal meets a first boundary condition; an SRS_pos for which a spatial relation signal is configured and a measurement result of the spatial relation reference signal meets a second boundary condition; or an SRS_pos for which a path loss reference signal is configured and a measurement result of the path loss reference signal meets a first boundary condition, and a spatial relation reference signal is configured and a measurement result of the spatial relation reference signal meets a second boundary condition.

Optionally, the uplink transmission on the time domain unit includes a plurality of SRS_pos, and the plurality of SRS_pos correspond to a plurality of uplink carriers; and if an uplink carrier on which a PUCCH is transmitted does not exist in the plurality of uplink carriers, a power allocation priority of a second SRS_pos in the plurality of SRS_pos is higher than power allocation priorities of other SRS_pos, where the second SRS_pos is an SRS_pos on an uplink carrier on which a non-SUL is transmitted, and the other SRS_pos are SRS_pos other than the second SRS_pos in the plurality of SRS_pos.

Optionally, the uplink transmission on the time domain unit includes at least two of an aperiodic uplink transmission, a semi-persistent uplink transmission, and a periodic uplink transmission; and a power allocation priority of the aperiodic uplink transmission is higher than or equal to a power allocation priority of the semi-persistent uplink transmission, and the power allocation priority of the semi-persistent uplink transmission is higher than or equal to a power allocation priority of the periodic uplink transmission; or a power allocation priority of the aperiodic uplink transmission is higher than or equal to a power allocation priority of the periodic uplink transmission, and the power allocation priority of the periodic uplink transmission is higher than or equal to a power allocation priority of the semi-persistent uplink transmission, where the uplink transmission is an SRS_pos or PSI.

Optionally, the uplink transmission on the time domain unit includes a first uplink transmission and a second uplink transmission, and a power allocation priority of the first uplink transmission is higher than or equal to a power allocation priority of the second uplink transmission, where the first uplink transmission includes an aperiodic SRS_pos, a semi-persistent SRS_pos, or a periodic SRS_pos, and the second uplink transmission includes an aperiodic SRS_MIMO, a semi-persistent SRS_MIMO, or a periodic SRS_MIMO.

Optionally, the uplink transmission on the time domain unit includes a first uplink transmission and a second uplink transmission, and a power allocation priority of the first uplink transmission is lower than a power allocation priority of the second uplink transmission, where the first uplink transmission includes an aperiodic SRS_pos, a semi-persistent SRS_pos, or a periodic SRS_pos, and the second uplink transmission includes an aperiodic SRS_MIMO, a semi-persistent SRS_MIMO, or a periodic SRS_MIMO.

Optionally, the uplink transmission on the time domain unit includes PSI carried on a PUSCH and PSI carried on a PUCCH; and a power allocation priority of the PSI carried on the PUSCH is higher than or equal to a power allocation priority of the PSI carried on the PUCCH.

Optionally, the uplink transmission on the time domain unit includes PSI carried on a PUSCH and PSI carried on a PUCCH; and a power allocation priority of the PSI carried on the PUSCH is lower than a power allocation priority of the PSI carried on the PUCCH.

Optionally, the uplink transmission on the time domain unit includes at least two of: aperiodic PSI carried on a PUSCH, semi-persistent PSI carried on a PUSCH, periodic PSI carried on a PUSCH, semi-persistent PSI carried on a PUCCH, or periodic PSI carried on a PUCCH; a power allocation priority of the aperiodic PSI carried on the PUSCH is higher than or equal to a power allocation priority of the semi-persistent PSI carried on the PUSCH; the power allocation priority of the semi-persistent PSI carried on the PUSCH is higher than or equal to a power allocation priority of the semi-persistent PSI carried on the PUCCH; the power allocation priority of the semi-persistent PSI carried on the PUCCH is higher than or equal to a power allocation priority of the periodic PSI carried on the PUCCH; and the power allocation priority of the periodic PSI carried on the PUCCH is higher than or equal to a power allocation priority of the periodic PSI carried on the PUSCH.

Optionally, the uplink transmission on the time domain unit includes at least two of: aperiodic PSI carried on a dynamic grant PUSCH, semi-persistent PSI carried on a dynamic grant PUSCH, periodic PSI carried on a dynamic grant PUSCH, aperiodic PSI carried on a grant-free PUSCH, semi-persistent PSI carried on a grant-free PUSCH, periodic PSI carried on a grant-free PUSCH, semi-persistent PSI carried on a PUCCH, or periodic PSI carried on a PUCCH; a power allocation priority of the aperiodic PSI carried on the dynamic grant PUSCH is higher than or equal to a power allocation priority of the aperiodic PSI carried on the grant-free PUSCH; the power allocation priority of the aperiodic PSI carried on the grant-free PUSCH is higher than or equal to a power allocation priority of the semi-persistent PSI carried on the dynamic grant PUSCH; the power allocation priority of the semi-persistent PSI carried on the dynamic grant PUSCH is higher than or equal to a power allocation priority of the semi-persistent PSI carried on the grant-free PUSCH; the power allocation priority of the semi-persistent PSI carried on the grant-free PUSCH is higher than or equal to a power allocation priority of the semi-persistent PSI carried on the PUCCH; the power allocation priority of the semi-persistent PSI carried on the PUCCH is higher than or equal to a power allocation priority of the periodic PSI carried on the PUCCH; and the power allocation priority of the periodic PSI carried on the PUCCH is higher than or equal to a power allocation priority of the periodic PSI carried on the grant-free PUSCH.

Optionally, the uplink transmission on the time domain unit includes at least two of: aperiodic PSI carried on a dynamic grant PUSCH, semi-persistent PSI carried on a dynamic grant PUSCH, aperiodic PSI carried on a grant-free type1 PUSCH, semi-persistent PSI carried on a grant-free type1 PUSCH, periodic PSI carried on a grant-free type1 PUSCH, aperiodic PSI carried on a grant-free type2 PUSCH, semi-persistent PSI carried on a grant-free type2 PUSCH, periodic PSI carried on a grant-free type2 PUSCH, semi-persistent PSI carried on a PUCCH, or periodic PSI carried on a PUCCH; a power allocation priority of the aperiodic PSI carried on the dynamic grant PUSCH is higher than or equal to a power allocation priority of the aperiodic PSI carried on the grant-free type2 PUSCH; the power allocation priority of the aperiodic PSI carried on the grant-free type2 PUSCH is higher than or equal to a power allocation priority of the aperiodic PSI carried on the grant-free type1 PUSCH; the power allocation priority of the aperiodic PSI carried on the grant-free type1 PUSCH is higher than or equal to a power allocation priority of the semi-persistent PSI carried on the dynamic grant PUSCH; the power allocation priority of the semi-persistent PSI carried on the dynamic grant PUSCH is higher than or equal to a power allocation priority of the semi-persistent PSI carried on the grant-free type2 PUSCH; the power allocation priority of the semi-persistent PSI carried on the grant-free type2 PUSCH is higher than or equal to a power allocation priority of the semi-persistent PSI carried on the grant-free type1 PUSCH; the power allocation priority of the semi-persistent PSI carried on the grant-free type1 PUSCH is higher than or equal to a power allocation priority of the semi-persistent PSI carried on the PUCCH; the power allocation priority of the semi-persistent PSI carried on the PUCCH is higher than or equal to a power allocation priority of the periodic PSI carried on the PUCCH; the power allocation priority of the periodic PSI carried on the PUCCH is higher than or equal to a power allocation priority of the periodic PSI carried on the grant-free type2 PUSCH; and the power allocation priority of the periodic PSI carried on the grant-free type2 PUSCH is higher than or equal to a power allocation priority of the periodic PSI carried on the grant-free type1 PUSCH.

Optionally, the uplink transmission on the time domain unit further includes a third uplink transmission, and the third uplink transmission is an uplink transmission different from an SRS_pos and PSI.

Optionally, the third uplink transmission includes at least two uplink transmissions with different power allocation priorities; and the power allocation priority of the uplink transmission is higher than or equal to a highest power allocation priority in at least two power allocation priorities; or the power allocation priority of the uplink transmission is lower than or equal to a lowest power allocation priority in at least two power allocation priorities; or the power allocation priority of the uplink transmission is between any two adjacent power allocation priorities in at least two power allocation priorities, where the at least two power allocation priorities are power allocation priorities of the at least two uplink transmissions.

Optionally, the uplink transmission on the time domain unit includes a plurality of uplink transmissions; and the power allocation apparatus further includes a dropping module. The dropping module is configured to: if a power allocation priority of one uplink transmission of the plurality of uplink transmissions is higher than a preset power allocation priority, not drop, by the UE, the one uplink transmission.

Optionally, in a case that a network device does not indicate a power allocation priority of the uplink transmission (at least one of an SRS_pos or PSI) on the time domain unit, the power allocation priority of the uplink transmission is a lowest power allocation priority in power allocation priorities of all uplink transmissions on the time domain unit; or the power allocation priority of the uplink transmission is a highest power allocation priority in power allocation priorities of all uplink transmissions on the time domain unit; or if the uplink transmission is an SRS_pos in a primary cell of a master cell group or an SRS_pos in a primary cell of a secondary cell group, the power allocation priority of the uplink transmission is a highest power allocation priority in power allocation priorities of all uplink transmissions on the time domain unit.

Optionally, the uplink transmission on the time domain unit includes a plurality of uplink transmissions with a same power allocation priority; and the power allocation module is specifically configured to reduce a transmit power of each of the plurality of uplink transmissions with the same power allocation priority on the time domain unit according to a preset proportion.

Optionally, the uplink transmission on the time domain unit includes a plurality of uplink transmissions with different power allocation priorities; and the power allocation module is specifically configured to: sequentially allocate, according to power allocation priorities, transmit powers to the plurality of uplink transmissions with different power allocation priorities on the time domain unit without power reduction, and allocate a remaining transmit power to a fourth uplink transmission when the remaining transmit power is less than a transmit power required for the fourth uplink transmission in the plurality of uplink transmissions with different power allocation priorities.

Optionally, the uplink transmission on the time domain unit includes a plurality of uplink transmissions with different power allocation priorities; and the power allocation module is specifically configured to: allocate a weight coefficient to each uplink transmission on the time domain unit according to a power allocation priority; and for each of the plurality of uplink transmissions with different power allocation priorities on the time domain unit, allocate a transmit power to one uplink transmission according to an original power of the uplink transmission and a weight coefficient of the uplink transmission.

Optionally, the power allocation priority is indicated by a network device, predefined, or selected by the UE.

Optionally, the uplink transmission on the time domain unit includes one or more SRS_pos; and a power allocation priority of at least one of the one or more SRS_pos is indicated by a network device.

According to the power allocation apparatus provided in this embodiment of this application, in a case that a total transmit power of UE on a time domain unit is greater than a power threshold, the power allocation apparatus may allocate a power to an uplink transmission on the time domain unit according to a power allocation priority. Because the power allocation priority includes a power allocation priority of the uplink transmission on the time domain unit, in a case that the uplink transmission on the time domain unit includes at least one of an SRS_pos or PSI, the power allocation apparatus may re-allocate a transmit power to the SRS_pos based on a power allocation priority of the SRS_pos, and may re-allocate a transmit power to the PSI based on a power allocation priority of the PSI, so that the power allocation apparatus can accurately allocate the transmit powers to the SRS_pos and the PSI. Therefore, in a positioning scenario, in a case that the total transmit power of the UE on the time domain unit is greater than the power threshold, the power allocation apparatus may correctly send a sounding reference signal for positioning or report positioning information.

The power allocation apparatus in the embodiments of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not limited in the embodiments of this application.

The power allocation apparatus in the embodiments of this application may be an apparatus with an operating system. The operating system may be an Android operating system, an iOS operating system, or another possible operating system. This is not limited in the embodiments of this application.

The power allocation apparatus provided in the embodiments of this application can implement the processes implemented in the method embodiments in FIG. 1 and FIG. 2, and achieve a same technical effect. To avoid repetition, details are not described herein again.

Optionally, as shown in FIG. 4, an embodiment of this application further provides a communications device 400, including a processor 401, a memory 402, and a program or an instruction stored in the memory 402 and executable on the processor 401. For example, when the communications device 400 is a terminal, the program or the instruction is executed by the processor 401 to implement the processes of the foregoing power allocation method embodiment, and a same technical effect can be achieved. When the communications device 400 is a network device, the program or the instruction is executed by the processor 401 to implement the processes of the foregoing power allocation method embodiment, and a same technical effect can be achieved. To avoid repetition, details are not described herein again.

Figure 5:
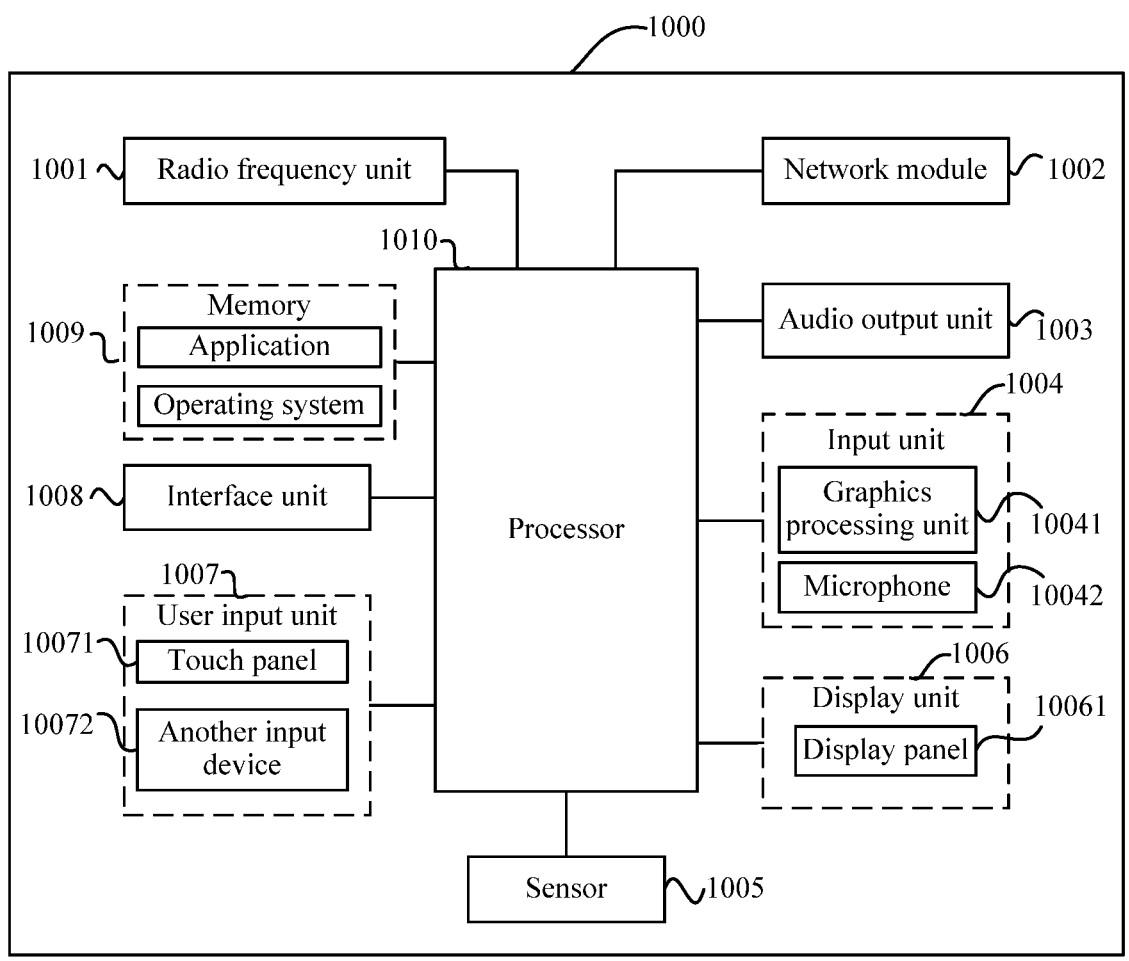
FIG. 5 is a schematic structural diagram of hardware of UE according to an embodiment of this application.

FIG. 5 is a schematic structural diagram of hardware of UE according to an embodiment of this application.

UE 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the UE 100 may further include a power supply (such as a battery) that supplies power to each component. The power supply may be logically connected to the processor 110 by using a power supply management system, to implement functions such as charging and discharging management, and power consumption management by using the power supply management system. The structure of the UE shown in FIG. 5 constitutes no limitation on the UE, and the UE may include more or fewer components than those shown in the figure, or combine some components, or have different component arrangements. Details are not described herein.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. Optionally, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network device and then sends the downlink data to the processor 110 for processing; and sends uplink data to the network device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application or an instruction required by at least one function (for example, a sound playing function or an image playing function). In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 110 may include one or more processing units. Optionally, an application processor and a modem processor may be integrated into the processor 110. The application processor mainly processes an operating system, a user interface, an application, an instruction, or the like. The modem processor mainly processes wireless communications, for example, a baseband processor. It can be understood that, alternatively, the modem processor may not be integrated into the processor 110.

The processor 110 is configured to: in a case that a total transmit power of user equipment UE on a time domain unit is greater than a power threshold, allocate a transmit power to an uplink transmission on the time domain unit according to a power allocation priority, where the uplink transmission includes at least one of a sounding reference signal for positioning SRS_pos or positioning state information PSI, and the power allocation priority includes a power allocation priority of the uplink transmission.

According to the UE provided in this embodiment of this application, in a case that a total transmit power of UE on a time domain unit is greater than a power threshold, the UE may allocate a power to an uplink transmission on the time domain unit according to a power allocation priority. Because the power allocation priority includes a power allocation priority of the uplink transmission on the time domain unit, in a case that the uplink transmission on the time domain unit includes at least one of an SRS_pos or PSI, the UE may re-allocate a transmit power to the SRS_pos based on a power allocation priority of the SRS_pos, and may re-allocate a transmit power to the PSI based on a power allocation priority of the PSI, so that the UE can accurately allocate the transmit powers to the SRS_pos and the PSI. Therefore, in a positioning scenario, in a case that the total transmit power of the UE on the time domain unit is greater than the power threshold, the UE may correctly send a sounding reference signal for positioning or report positioning information.

Optionally, the processor 110 is further configured to: if a power allocation priority of one uplink transmission of a plurality of uplink transmissions on a time domain unit is higher than a preset power allocation priority, not drop the one uplink transmission.

Optionally, the uplink transmission on the time domain unit includes a plurality of uplink transmissions with a same power allocation priority; and the processor 110 is further configured to reduce a transmit power of each of the plurality of uplink transmissions with the same power allocation priority on the time domain unit according to a preset proportion.

Optionally, the uplink transmission on the time domain unit includes a plurality of uplink transmissions with different power allocation priorities; and the processor 110 is further configured to: sequentially allocate, according to power allocation priorities, transmit powers to the plurality of uplink transmissions with different power allocation priorities on the time domain unit without power reduction, and allocate a remaining transmit power to a fourth uplink transmission when the remaining transmit power is less than a transmit power required for the fourth uplink transmission in the plurality of uplink transmission.

Optionally, the uplink transmission on the time domain unit includes a plurality of uplink transmissions with different power allocation priorities. A weight coefficient is allocated to each uplink transmission on the time domain unit according to a power allocation priority; and for each of the plurality of uplink transmissions with different power allocation priorities on the time domain unit, the UE allocate a transmit power to one uplink transmission according to an original power of the uplink transmission and a weight coefficient of the uplink transmission.

Figure 6:
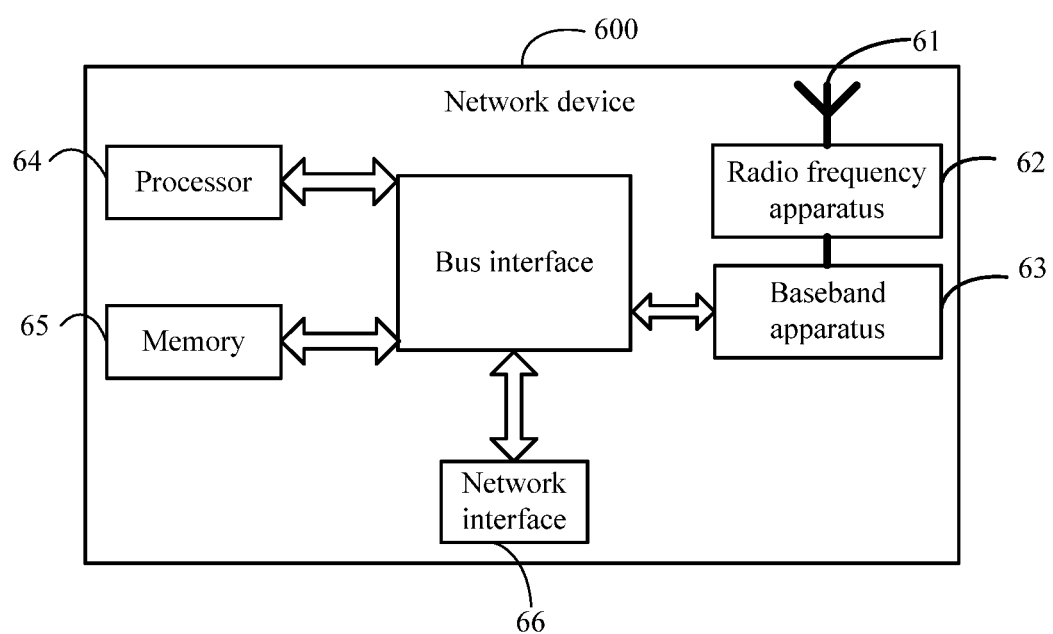
FIG. 6 is a schematic structural diagram of a network device according to an embodiment of this application.

Optionally, an embodiment of this application further provides a network device. As shown in FIG. 6, a network device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes information that needs to be sent, and sends processed information to the radio frequency apparatus 62. The radio frequency apparatus 62 processes the received information, and sends processed information by using the antenna 61.

The frequency band processing apparatus may be located in the baseband apparatus 63. The method performed by the network device in the foregoing embodiment may be implemented in the baseband apparatus 63. The baseband apparatus 63 includes a processor 64 and a memory 65.

The baseband apparatus 63 may include, for example, at least one baseband board, where a plurality of chips are disposed on the baseband board. As shown in FIG. 6, one chip is, for example, the processor 64, which is connected to the memory 65, so as to invoke a program in the memory 65 to perform operations of the network device shown in the foregoing method embodiment.

The baseband apparatus 63 may further include a network interface 66, configured to exchange information with the radio frequency apparatus 62. For example, the interface is a common public radio interface (CPRI).

Optionally, the network device in this embodiment of the present application further includes an instruction or a program stored in the memory 65 and executable on the processor 64. The processor 64 invokes the instruction or the program in the memory 65 to perform the method performed by the modules shown in FIG. 6, and a same technical effect is achieved. To avoid repetition, details are not described herein again.

An embodiment of this application further provides a non-transitory computer-readable storage medium. The non-transitory computer-readable storage medium stores a program or an instruction, and when the program or the instruction is executed by a processor, the processes of the foregoing power allocation method embodiment are implemented and a same technical effect can be achieved. To avoid repetition, details are not described herein again.

The processor is a processor in the UE in the foregoing embodiment. The non-transitory computer-readable storage medium includes a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to execute a program or an instruction to implement the processes of the foregoing power allocation method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A power allocation method, wherein the method comprises:
   in a case that a total transmit power of a user equipment (UE) on a time domain unit is greater than a power threshold, allocating, by the UE, a transmit power to an uplink transmission on the time domain unit according to a power allocation priority, wherein
   the uplink transmission comprises at least one of a sounding reference signal for positioning (SRS_pos) or positioning state information (PSI), and the power allocation priority comprises a power allocation priority of the uplink transmission;
   wherein the uplink transmission comprises a plurality of SRS_pos; and
   power allocation priorities of the plurality of SRS_pos are same.

2. The method according to claim 1, wherein the uplink transmission comprises at least two of an aperiodic uplink transmission, a semi-persistent uplink transmission, or a periodic uplink transmission; and
- a power allocation priority of the aperiodic uplink transmission is higher than or equal to a power allocation priority of the semi-persistent uplink transmission, and the power allocation priority of the semi-persistent uplink transmission is higher than or equal to a power allocation priority of the periodic uplink transmission; or
- a power allocation priority of the aperiodic uplink transmission is higher than or equal to a power allocation priority of the periodic uplink transmission, and the power allocation priority of the periodic uplink transmission is higher than or equal to a power allocation priority of the semi-persistent uplink transmission, wherein the uplink transmission is an SRS_pos or PSI.

3. The method according to claim 1, wherein the uplink transmission comprises a first uplink transmission and a second uplink transmission, and a power allocation priority of the first uplink transmission is higher than or equal to a power allocation priority of the second uplink transmission, or a power allocation priority of the first uplink transmission is lower than a power allocation priority of the second uplink transmission, wherein the first uplink transmission comprises an aperiodic SRS_pos, a semi-persistent SRS_pos, or a periodic SRS_pos, and the second uplink transmission comprises an aperiodic multiple-input multiple-output sounding reference signal (SRS_MIMO), a semi-persistent SRS_MIMO, or a periodic SRS_MIMO.

4. The method according to claim 1, wherein the uplink transmission comprises PSI carried on a physical uplink shared channel (PUSCH) and PSI carried on a physical uplink control channel (PUCCH); and
- a power allocation priority of the PSI carried on the PUSCH is higher than or equal to a power allocation priority of the PSI carried on the PUCCH; or a power allocation priority of the PSI carried on the PUSCH is lower than a power allocation priority of the PSI carried on the PUCCH.

5. The method according to claim 1, wherein the uplink transmission comprises at least two of: aperiodic PSI carried on a physical uplink shared channel (PUSCH), semi-persistent PSI carried on a PUSCH, periodic PSI carried on a PUSCH, semi-persistent PSI carried on a physical uplink control channel (PUCCH), or periodic PSI carried on a PUCCH;
- a power allocation priority of the aperiodic PSI carried on the PUSCH is higher than or equal to a power allocation priority of the semi-persistent PSI carried on the PUSCH;
- the power allocation priority of the semi-persistent PSI carried on the PUSCH is higher than or equal to a power allocation priority of the semi-persistent PSI carried on the PUCCH;
- the power allocation priority of the semi-persistent PSI carried on the PUCCH is higher than or equal to a power allocation priority of the periodic PSI carried on the PUCCH; and
- the power allocation priority of the periodic PSI carried on the PUCCH is higher than or equal to a power allocation priority of the periodic PSI carried on the PUSCH.

6. The method according to claim 1, wherein the uplink transmission comprises at least two of: aperiodic PSI carried on a dynamic grant physical uplink shared channel (PUSCH), semi-persistent PSI carried on a dynamic grant PUSCH, periodic PSI carried on a dynamic grant PUSCH, aperiodic PSI carried on a grant-free PUSCH, semi-persistent PSI carried on a grant-free PUSCH, periodic PSI carried on a grant-free PUSCH, semi-persistent PSI carried on a physical uplink control channel (PUCCH), or periodic PSI carried on a PUCCH;
- a power allocation priority of the aperiodic PSI carried on the dynamic grant PUSCH is higher than or equal to a power allocation priority of the aperiodic PSI carried on the grant-free PUSCH;
- the power allocation priority of the aperiodic PSI carried on the grant-free PUSCH is higher than or equal to a power allocation priority of the semi-persistent PSI carried on the dynamic grant PUSCH;
- the power allocation priority of the semi-persistent PSI carried on the dynamic grant PUSCH is higher than or equal to a power allocation priority of the semi-persistent PSI carried on the grant-free PUSCH;
- the power allocation priority of the semi-persistent PSI carried on the grant-free PUSCH is higher than or equal to a power allocation priority of the semi-persistent PSI carried on the PUCCH;
- the power allocation priority of the semi-persistent PSI carried on the PUCCH is higher than or equal to a power allocation priority of the periodic PSI carried on the PUCCH; and
- the power allocation priority of the periodic PSI carried on the PUCCH is higher than or equal to a power allocation priority of the periodic PSI carried on the grant-free PUSCH.

7. The method according to claim 1, wherein the uplink transmission comprises at least two of: aperiodic PSI carried on a dynamic grant physical uplink shared channel (PUSCH), semi-persistent PSI carried on a dynamic grant PUSCH, aperiodic PSI carried on a grant-free type1 PUSCH, semi-persistent PSI carried on a grant-free type1 PUSCH, periodic PSI carried on a grant-free type1 PUSCH, aperiodic PSI carried on a grant-free type2 PUSCH, semi-persistent PSI carried on a grant-free type2 PUSCH, periodic PSI carried on a grant-free type2 PUSCH, semi-persistent PSI carried on a physical uplink control channel (PUCCH), or periodic PSI carried on a PUCCH;
- a power allocation priority of the aperiodic PSI carried on the dynamic grant PUSCH is higher than or equal to a power allocation priority of the aperiodic PSI carried on the grant-free type2 PUSCH;
- the power allocation priority of the aperiodic PSI carried on the grant-free type2 PUSCH is higher than or equal to a power allocation priority of the aperiodic PSI carried on the grant-free type1 PUSCH;
- the power allocation priority of the aperiodic PSI carried on the grant-free type1 PUSCH is higher than or equal to a power allocation priority of the semi-persistent PSI carried on the dynamic grant PUSCH;
- the power allocation priority of the semi-persistent PSI carried on the dynamic grant PUSCH is higher than or equal to a power allocation priority of the semi-persistent PSI carried on the grant-free type2 PUSCH;
- the power allocation priority of the semi-persistent PSI carried on the grant-free type2 PUSCH is higher than or equal to a power allocation priority of the semi-persistent PSI carried on the grant-free type1 PUSCH;

the power allocation priority of the semi-persistent PSI carried on the grant-free type1 PUSCH is higher than or equal to a power allocation priority of the semi-persistent PSI carried on the PUCCH;

the power allocation priority of the semi-persistent PSI carried on the PUCCH is higher than or equal to a power allocation priority of the periodic PSI carried on the PUCCH;

the power allocation priority of the periodic PSI carried on the PUCCH is higher than or equal to a power allocation priority of the periodic PSI carried on the grant-free type2 PUSCH; and the power allocation priority of the periodic PSI carried on the grant-free type2 PUSCH is higher than or equal to a power allocation priority of the periodic PSI carried on the grant-free type1 PUSCH.

8. The method according to claim 1, wherein the uplink transmission further comprises a third uplink transmission, and the third uplink transmission is an uplink transmission different from an SRS_pos and PSI; wherein the third uplink transmission comprises at least two uplink transmissions with different power allocation priorities; and the power allocation priority of the uplink transmission is higher than or equal to a highest power allocation priority in at least two power allocation priorities;

or the power allocation priority of the uplink transmission is lower than or equal to a lowest power allocation priority in at least two power allocation priorities;

or the power allocation priority of the uplink transmission is between any two adjacent power allocation priorities in at least two power allocation priorities, wherein the at least two power allocation priorities are power allocation priorities of the at least two uplink transmissions.

9. The method according to claim 1, wherein the uplink transmission comprises a plurality of uplink transmissions; and the method further comprises:

if a power allocation priority of one uplink transmission of the plurality of uplink transmissions is higher than a preset power allocation priority, not dropping, by the UE, the one uplink transmission.

10. The method according to claim 1, wherein in a case that a network device does not indicate the power allocation priority of the uplink transmission, the power allocation priority of the uplink transmission is a lowest power allocation priority in power allocation priorities of all uplink transmissions on the time domain unit;

or the power allocation priority of the uplink transmission is a highest power allocation priority in power allocation priorities of all uplink transmissions on the time domain unit;

or if the uplink transmission is an SRS_pos in a primary cell of a master cell group or an SRS_pos in a primary cell of a secondary cell group, the power allocation priority of the uplink transmission is a highest power allocation priority in power allocation priorities of all uplink transmissions on the time domain unit.

11. The method according to claim 1, wherein the uplink transmission comprises a plurality of uplink transmissions with a same power allocation priority; and the allocating, by the UE, a transmit power to an uplink transmission on the time domain unit according to a power allocation priority comprises:

reducing, by the UE, a transmit power of each of the plurality of uplink transmissions on the time domain unit according to a preset proportion.

12. The method according to claim 1, wherein the uplink transmission comprises a plurality of uplink transmissions with different power allocation priorities; and the allocating, by the UE, a transmit power to an uplink transmission on the time domain unit according to a power allocation priority comprises:

sequentially allocating, by the UE according to power allocation priorities, transmit powers to the plurality of uplink transmissions on the time domain unit without power reduction, and allocating a remaining transmit power to a fourth uplink transmission when the remaining transmit power is less than a transmit power required for the fourth uplink transmission in the plurality of uplink transmissions.

13. The method according to claim 1, wherein the uplink transmission comprises a plurality of uplink transmissions with different power allocation priorities; and the allocating, by the UE, a transmit power to an uplink transmission on the time domain unit according to a power allocation priority comprises:

allocating, by the UE, a weight coefficient to each uplink transmission on the time domain unit according to a power allocation priority; and for each of the plurality of uplink transmissions, allocating, by the UE, a transmit power to one uplink transmission according to an original power of the one uplink transmission and a weight coefficient of the one uplink transmission.

14. The method according to claim 1, wherein a power allocation priority of at least one of the plurality of SRS_pos is indicated by a network device.

15. The method according to claim 14, wherein an identifier corresponding to one of the plurality of SRS_pos comprises at least one of the following: an SRS resource set identifier, a serving cell identifier in which an SRS is located, an bandwidth part identifier in which an SRS is located.

16. A chip, wherein the chip comprises a processor and a communications interface, the communications interface is coupled to the processor, and the processor is configured to execute a program or an instruction to implement the power allocation method according to claim 1.

17. The method according to claim 1, wherein the plurality of SRS_pos having the same power allocation priority are in a same band, and when the plurality of SRS_pos are transmitted simultaneously, the plurality of SRS_pos are overlapping SRS resources on a same symbol on different uplink carriers.

18. The method according to claim 1, when the plurality of SRS_pos are transmitted simultaneously, types of the plurality of SRS_pos are same, and wherein the type comprises any one of the following: periodic, aperiodic, or semi-persistent.

19. A user equipment (UE), comprising a processor, a memory, and a program or an instruction stored in the memory and executable on the processor, wherein the program or the instruction, when executed by the processor, causes the processor to perform:

in a case that a total transmit power of the UE on a time domain unit is greater than a power threshold, allocating, by the UE, a transmit power to an uplink transmission on the time domain unit according to a power allocation priority, wherein the uplink transmission comprises at least one of a sounding reference signal for positioning (SRS_pos) or positioning state information (PSI), and the power allocation priority comprises a power allocation priority of the uplink transmission;

wherein the uplink transmission comprises a plurality of SRS_pos; and power allocation priorities of the plurality of SRS_pos are same.

20. A non-transitory computer-readable storage medium, wherein the non-transitory computer-readable storage medium stores a program or an instruction, and the program or the instruction, when executed by a processor, causes the processor to perform:

in a case that a total transmit power of a user equipment (UE) on a time domain unit is greater than a power threshold, allocating, by the UE, a transmit power to an uplink transmission on the time domain unit according to a power allocation priority, wherein the uplink transmission comprises at least one of a sounding reference signal for positioning (SRS_pos) or positioning state information (PSI), and the power allocation priority comprises a power allocation priority of the uplink transmission;

wherein the uplink transmission comprises a plurality of SRS_pos; and power allocation priorities of the plurality of SRS_pos are same.

* * * * *